(12) United States Patent
Peng et al.

(10) Patent No.: US 10,839,830 B1
(45) Date of Patent: Nov. 17, 2020

(54) REFLECTIVE HEATSINK STRUCTURES FOR HEAT-ASSISTED MAGNETIC RECORDING HEADS

(71) Applicant: Seagate Technology LLC, Cupertino, CA (US)

(72) Inventors: Chubing Peng, Eden Prairie, MN (US); Martin Giles Blaber, Minneapolis, MN (US); Tae-Woo Lee, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/714,933

(22) Filed: Dec. 16, 2019

(51) Int. Cl.
    *G11B 5/48* (2006.01)
    *G11B 5/60* (2006.01)
    *G11B 5/31* (2006.01)
    *G11B 5/00* (2006.01)

(52) U.S. Cl.
    CPC .......... *G11B 5/3133* (2013.01); *G11B 5/4826* (2013.01); *G11B 5/6082* (2013.01); *G11B 2005/0021* (2013.01)

(58) Field of Classification Search
    CPC ............... G11B 5/3133; G11B 5/4826; G11B 2005/0021; G11B 5/6082; G11B 5/314; G11B 5/02; G11B 5/012; G11B 5/40; G11B 5/4866; G11B 5/6088; G11B 7/1263
    See application file for complete search history.

(56) References Cited

U.S. PATENT DOCUMENTS

| | | | |
|---|---|---|---|
| 8,897,105 B1 | 11/2014 | Zuckerman et al. | |
| 9,147,427 B1* | 9/2015 | Lee | G11B 5/3133 |
| 9,196,278 B1* | 11/2015 | Tatah | G11B 5/4866 |
| 9,728,209 B2* | 8/2017 | Chen | G11B 5/314 |
| 10,002,626 B1* | 6/2018 | Cheng | G11B 5/314 |
| 10,224,064 B2* | 3/2019 | Natarajarathinam | G11B 5/1272 |
| 10,438,617 B2* | 10/2019 | Gorantla | G11B 5/3133 |
| 10,490,221 B1* | 11/2019 | Chen | G11B 13/08 |
| 2016/0133286 A1* | 5/2016 | Lee | G11B 5/3133 369/13.33 |

* cited by examiner

*Primary Examiner* — Brian E Miller
(74) *Attorney, Agent, or Firm* — Mueting Raasch Group

(57) ABSTRACT

A recording head comprises a waveguide core extending to an air-bearing surface, and a near-field transducer is centrally aligned with the waveguide core and positioned proximate a first side of the waveguide core in a down-track direction. First and second mirror portions form a mirror surrounding the near-field transducer in a cross-track direction with a gap therebetween. The mirror extends in the direction normal to the air-bearing surface a first distance that is less than a second distance the near-field transducer extends in the direction normal the air-bearing surface. First and second reflective heatsink structures are respectively coupled to the first and second mirror portions. The heatsink structures are spaced apart from the near-field transducer in the cross-track direction and extend in a direction normal the air-bearing surface, such that proximate the air-bearing surface the first and second reflective heatsink structures extend substantially parallel to, or converge toward, each other.

20 Claims, 18 Drawing Sheets

REFLECTIVE HEATSINK STRUCTURES FOR HEAT-ASSISTED MAGNETIC RECORDING HEADS

SUMMARY

Embodiments of the disclosure are directed to a recording head comprising a waveguide core extending to an air-bearing surface and a near-field transducer centrally aligned with the waveguide core and positioned proximate a first side of the waveguide core in a down-track direction. First and second mirror portions form a mirror and surround the near-field transducer in a cross-track direction with a gap therebetween. The mirror extends in the direction normal to the air-bearing surface a first distance that is less than a second distance that the near-field transducer extends in the direction normal to the air-bearing surface. First and second reflective heatsink structures are respectively coupled to the first and second mirror portions. The reflective heatsink structures are spaced apart from the near-field transducer in the cross-track direction and extend in a direction normal to the air-bearing surface such that proximate the air-bearing surface the first and second reflective heatsink structures extend substantially parallel to, or converge toward, each other.

Further embodiments are directed to a recording head comprising a waveguide core extending to an air-bearing surface and a near-field transducer centrally aligned with the waveguide core and positioned proximate a first side of the waveguide core in a down-track direction. First and second mirror portions form a mirror and surround the near-field transducer in a cross-track direction with a gap therebetween. The mirror extends in the direction normal to the air-bearing surface a first distance that is less than a second distance that the near-field transducer extends in the direction normal to the air-bearing surface. First and second reflective heatsink structures are respectively coupled to the first and second mirror portions. The reflective heatsink structures are spaced apart from the near-field transducer in the cross-track direction and extend in a direction normal to the air-bearing surface. They have a third distance between the first and second structures proximate the air-bearing surface and a fourth distance between the first and second structures distal the air-bearing surface, where the fourth distance is equal to or smaller than the third distance.

Additional embodiments are directed to a recording head comprising a waveguide core extending to an air-bearing surface and a near-field transducer centrally aligned with the waveguide core and positioned proximate a first side of the waveguide core in a down-track direction. First and second mirror portions form a mirror and surround the near-field transducer in a cross-track direction with a gap therebetween, the mirror extending in the direction normal to the air-bearing surface a first distance that is less than a second distance that the near-field transducer extends in the direction normal to the air-bearing surface. First and second reflective heatsink structures are respectively coupled to the first and second mirror portions. The heatsink structures are spaced apart from the near-field transducer in the cross-track direction and extend in a direction normal to the air-bearing surface such that proximate the air-bearing surface the first and second reflective heatsink structures extend substantially parallel to each other and distal the air-bearing surface the first and second reflective heatsink structures curve away from each other toward respective distal edges.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

FIG. 16A illustrates the down-track thermal gradient as a function of the height of the reflective heatsink structures of FIG. 10A;

FIG. 16B illustrates the down-track thermal gradient as a function of the distance between the reflective heatsink structures of FIG. 10A.

DETAILED DESCRIPTION

Figure 1:
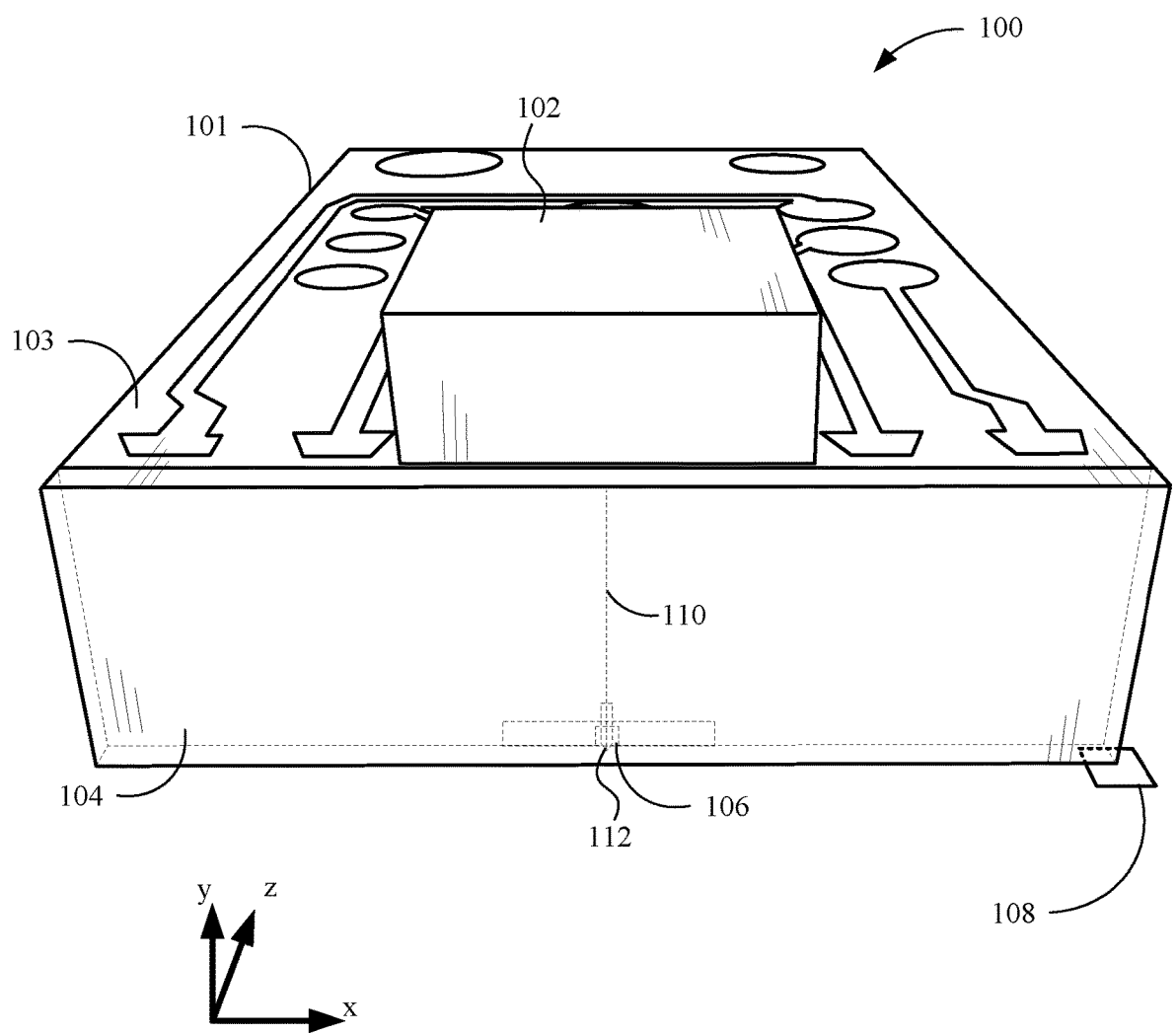
FIG. 1 is a perspective view of a heat-assisted magnetic recording slider assembly according to embodiments discussed herein.

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a source of optical energy (e.g., a laser diode) is integrated with a recording head and couples optical energy to a waveguide or other light transmission path. The waveguide delivers the optical energy to a near-field transducer (NFT). The NFT concentrates the optical energy into a tiny optical spot in a recording layer of a magnetic recording medium, which raises the medium's temperature locally, reducing the writing magnetic field required for high-density recording.

A HAMR read/write element, sometimes referred to as a slider, recording head, read head, write head, read/write head, etc., includes magnetic read and write transducers similar to those on current hard drives. For example, a magnetoresistive sensor reads data by detecting magnetic fluctuations of a magnetic medium as it moves underneath the sensor. Data is written to the magnetic medium by a write coil that is magnetically coupled to a write pole. The write pole changes magnetic orientation in regions of the media as it moves underneath the write pole in response to an energizing current applied to the write coil. The HAMR slider also includes a source of energy, such as a laser diode, to heat the media while it is being written to by the write pole. An optical delivery path, such as a waveguide, is integrated into the HAMR slider to deliver the energy to the surface of the media.

The optical delivery path of a HAMR slider may include a plasmonic transducer proximate a media-facing surface (e.g., air-bearing surface (ABS), contact surface). The plasmonic transducer shapes and transmits the energy to a small region on the medium. The plasmonic transducer is sometimes referred to as a near-field transducer, optical antenna, surface plasmon resonator, etc., and may include a plasmonic metal such as gold, silver, copper, aluminum, rhodium, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature (Tc) and having dimensions less than 100 nm (e.g., ~50 nm).

The resonance of light-induced surface plasmons generated by the NFT at a metal-dielectric interface in the recording head create some unique phenomena. For example, it enhances a high electric field and subwavelength light concentration, which enables heat-assisted magnetic recording. However, there are disadvantageous effects such as the scattering/radiation of light, e.g., a change in the light propagation direction, as the light approaches and enters the NFT from the waveguide. The high electric field enhancement of the plasmon resonance also results in strong light scattering, i.e., radiation damping, which inhibits further enhancement of the local optical field. Other effects include nonlinear interaction, photoluminescence, and light absorption, which results in reliability concerns and may be further worsened based on the materials present in a HAMR slider. For example, some component materials having useful thermal gradient properties necessitate higher laser powers to reach recording temperatures, which cause high head temperatures and larger laser induced head protrusion. Embodiments described herein provide reflective heatsink structures to suppress light scattering and/or block light from interacting with certain component materials. These structures improve NFT and overall recording head performance by enhancing the generated near-field, reducing optical power required for writing operations, and reducing current-induced effects on head temperatures.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite a media-facing surface 108 that is positioned over a surface of a recording media (not shown) during device operation. The media facing surface 108 faces, and is held proximate to, the moving media surface while reading and writing to the media. The media-facing surface 108 may be configured as an air-bearing surface that maintains separation from the media surface via a thin layer of air.

The laser diode 102 delivers light to a region proximate a HAMR read/write head 106, which is located near the media-facing surface 108. The energy heats the recording media as it passes by the read/write head 106. Optical coupling components, such as a waveguide system 110, are integrally formed within the slider body 101 (e.g., near a trailing edge surface 104 of the slider) and function as an optical path that delivers energy from the laser diode 102 to the recording media via a NFT 112. The NFT 112 is proximate the writer of the read/write head 106 and causes heating of the media during recording operations.

The laser diode 102 may be configured as either an edge-emitting laser or surface-emitting laser. While the representative embodiment in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be externally mounted to the slider 100, and coupled to the slider by way of optic fiber and/or a waveguide. An input surface of the slider body 103 may include a grating or other coupling feature to receive light from the laser via the optic fiber and/or waveguide.

Figure 2:
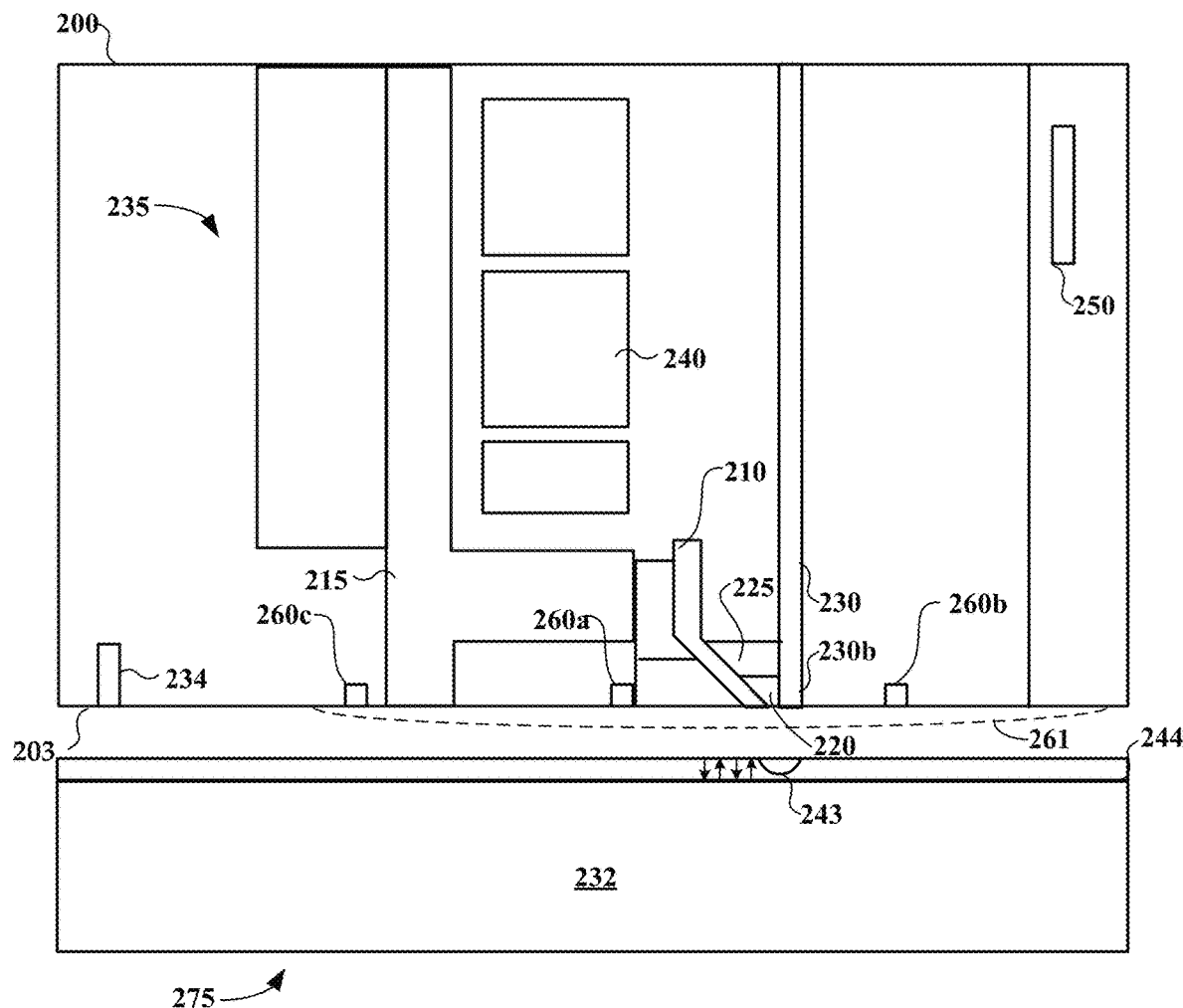
FIG. 2 is a cross-sectional view of a heat-assisted magnetic recording slider assembly according to embodiments discussed herein.

In FIG. 2, a cross-section diagram shows a slider 200 according to various embodiments. The head transducer 200 is shown positioned over a writeable medium 275 (e.g., magnetic disk) that generally includes a substrate 232 on which at least a hard magnetic layer 244 is deposited or otherwise formed. An NFT 220 is located between a write pole 210 and a waveguide 230 at a media-facing surface 203. A small portion or spot 243 of the layer 244 is heated via waveguide 230 and NFT 220 to reduce the coercivity of the material enough so that the magnetic field from the magnetic write pole 210 is strong enough to change the magnetization direction of the recording layer 244. Bits of information may then be recorded in the form of a perpendicular upward/downward magnetization direction for a series of magnetic domains in the layer 244.

The portion of head transducer 200 illustrated in FIG. 2 may include a number of heat generating components at the media-facing surface 203, such as write coil 240, NFT 220, and a heater 250. Due to thermal expansion of the surrounding material (e.g., dielectric material), the heat can cause a thermal protrusion at the media-facing surface 203, indicated by dashed line 261. Generally, the heater 250 is used to finely adjust head-media spacing near the protrusion to obtain a desired spacing between the media 275 and read/write transducers 234, 235.

This head-media spacing can also be referred to as the slider's fly height. It is often desirable to have a relatively small distance or spacing between a recording head transducer and its associated medium. By reducing the head-media spacing, a recording head transducer is typically better able to both write and read data to and from a medium. Reducing the head-media spacing also allows for surveying of recording medium topography, such as for detecting asperities and other features of the recording medium surface.

One or more thermal sensors, e.g., temperature coefficient of resistance (TCR) sensors or differential-ended temperature coefficient of resistance (DETCR) sensors, can be located within a protrusion region at one or more optional locations. Historically these sensors have been used during manufacturing to set head-disk spacing or to detect thermal asperities (TA) on an associated medium during a certification process. As shown in FIG. 2, optional thermal sensors 260a, 260b, 260c are located at different locations within the region of protrusion 261. In many embodiments, only one thermal sensor is used. In some embodiments, as illustrated by thermal sensor 260a, a thermal sensor is located in the region of the writer 235, near the write pole 210, return pole 215, and/or the NFT 220. Thermal sensor 260b may be referred to as a leading sensor as it will pass over the media prior to the NFT and write pole. A thermal sensor may also be located proximate the reader if used primarily for thermal asperity detection.

Thermal sensors 260a, 260b, 260c are coupled to signal processing circuitry as is known in the art. The circuitry determines temperatures at or near the media-facing surface 203, and those measured temperatures can be used for a number of purposes, such as controlling the heater 250 to adjust head-media spacing at the protrusion region 261, detecting contact with the recording medium, and/or monitoring the power of the laser diode. It has been demonstrated that for a head transducer having a thermal sensor reasonably close to the NFT 220, it is possible to measure changes in thermal conductance across the head-disc interface and to use this to monitor changes, such as those due to clearance changes or due to contamination. In addition to monitoring and controlling the heater 250, heat transfer is controlled in the head 200 with the inclusion of one or more heatsinking structures 225, which are discussed further below.

Figure 3:
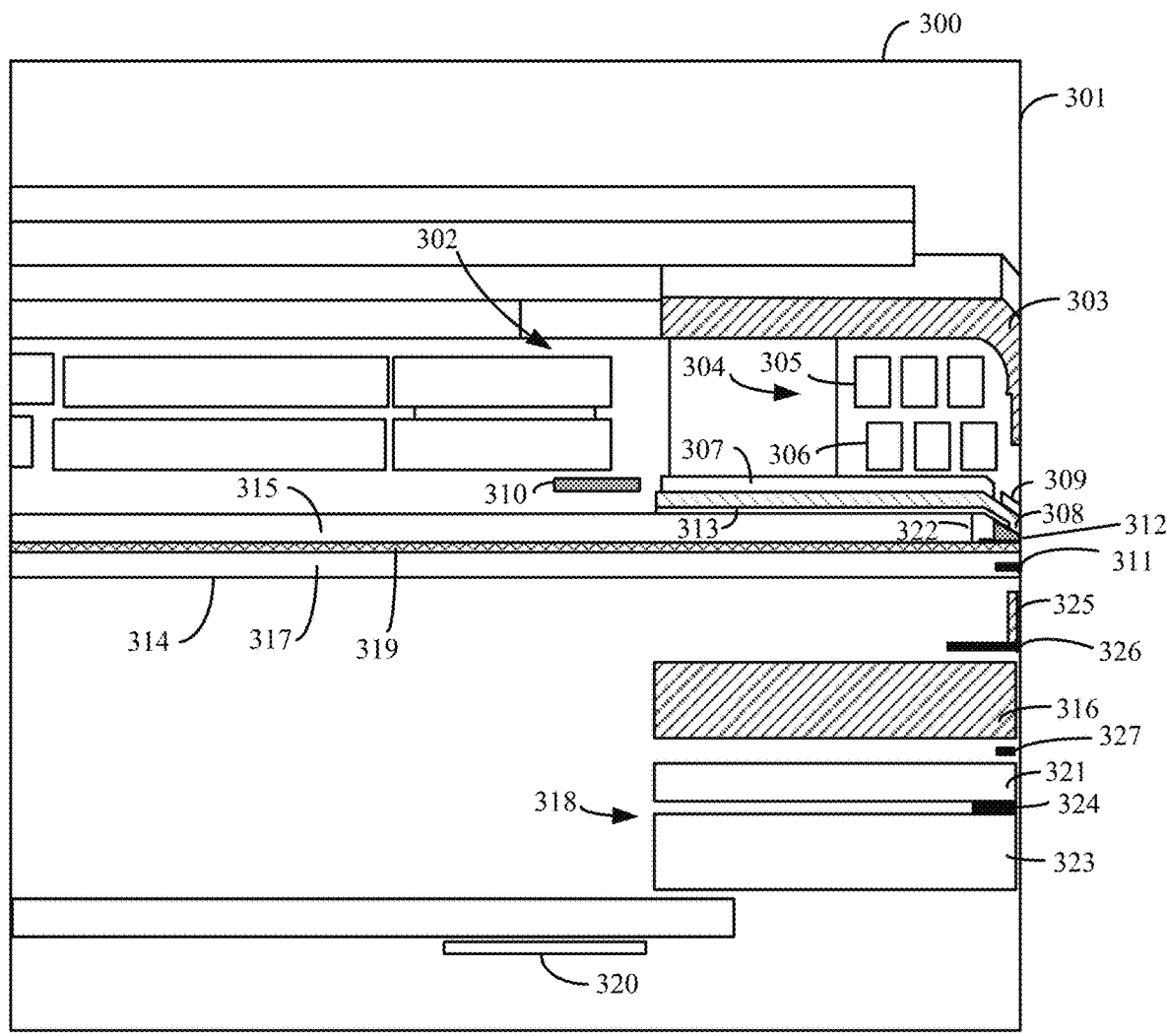
FIG. 3 is a cross-sectional view of portions of a slider body near an air-bearing surface according to embodiments discussed herein.

In FIG. 3, a cross-sectional view illustrates portions of the slider body 300 near the media-facing ABS 301 in further detail according to various embodiments. A writer 302 includes a number of components, including a second return pole 303 proximate a write coil 304. The write coil 304 includes an upper coil 305 and a lower coil 306. The write coil 304 may conform to any writer coil design, including a double-pancake design, single-layer pancake design, or a helical coil design, for example.

The write coil 304 is configured to energize a write pole 308. A magnetic yoke 307 is disposed between the write coil 304 and the write pole 308. A heatsink structure, e.g., a write pole heatsink, 309 is thermally coupled to the write pole 308. A writer heater 310 is positioned proximate the write pole 308 and is configured to thermally actuate the write pole 308 during write operations. An NFT 312 is situated proximate the write pole 308 and is optically coupled to an optical waveguide 314. The waveguide 314 includes an upper cladding layer 315, a lower cladding layer 317, and a core 319 between the upper and lower cladding layers 315, 317. A diffuser 313 thermally couples to the NFT 312 and extends between at least a portion of the write pole 308 and the upper cladding layer 315. One or more additional heatsink structures 322 thermally couple the NFT 312 to the diffuser 313 and/or other heatsink structures (e.g., heat channel, mini-solid immersion mirrors (not shown)). The writer 302 also includes a leading shield 325, a reflector 326 positioned at or near the ABS, and a first return pole 316, which is magnetically coupled to the write pole 308 and the second return pole 303. The slider 300 also includes a reader 318. The reader 318 includes a read element 324 (e.g., a GMR sensor) disposed between a pair of reader shields 321, 323. A reader heater 320 is located proximate the reader 318, which is configured to thermally actuate the reader 318 during read operations.

A contact sensor 311 may be positioned at or near the ABS 301 in the waveguide cladding 317. At this location, the contact sensor 311 is arranged to detect contact between a close point of the writer 302 (when thermally actuated by one or more heating elements) and a magnetic recording medium. The slider 300 also includes a contact sensor 327 positioned proximate the reader 318. The contact sensor 327 is configured to detect contact between a close point of the reader 318 (when thermally actuated by one or more heating elements) and the recording medium. In some embodiments, the writer contact sensor 311 is coupled (in series or in parallel) to the reader contact sensor 327. In other embodiments, the writer and reader contact sensors 311 and 327 are independent of each other.

The contact sensors 311, 327 are typically thermal sensors having a temperature coefficient of resistance (referred to herein as TCR sensors, such as a differential-ended TCR sensor or DETCR). A DETCR sensor is configured to operate with each of its two electrical contacts or leads (ends) connected to respective bias sources provided by a pair of electrical bond pads of the slider. According to various embodiments described herein, the thermal sensor may be referred to as a contact sensor, a thermal asperity sensor, a laser power monitor, and/or a DETCR. The TCR sensors 311, 327 are configured to sense changes in heat flow for detecting onset of head-medium contact. The TCR sensor 311 is also configured to sense changes in temperature due to light absorption from the waveguide core 319 for monitoring laser power.

Thermal sensor 311 is located on the leading edge, or position, of the slider to pass over the media prior to the NFT and write pole. As a DETCR, the laser power monitoring signal of sensor 311 comes from the temperature change and the resulting resistance change ($\Delta V \sim \Delta R * I_{bias}$). Therefore, the change in resistance ($\Delta R$) between the laser being "on" and the laser being "off" represents the signal strength. When the laser goes from "off" to "on," three sources can lead to the change in sensor resistance: 1) heat transfer from the NFT region (the closer to the NFT, the higher the $\Delta R$), 2) light absorption (light escaping from the waveguide core), and 3) media back heating (likely an overall small effect on the $\Delta R$). However, a higher change in resistance is accompanied by higher temperatures. Therefore, a stronger signal (higher $\Delta R$) is countered with lower reliability (higher temperature) for the thermal sensor 311.

This is also true for the head overall—higher temperatures lead to reliability issues. Reducing the amount of light that escapes the waveguide core, or reflecting that escaped light back to the core/NFT, also reduces the temperatures of various head components and the overall head temperature. Embodiments described herein are directed to various reflective heatsinking structures that suppress light scattering and further concentrate light at the metal surface to directly interact with the NFT. The described reflective heatsinking structures may be combinable with each other.

Figure 4A:
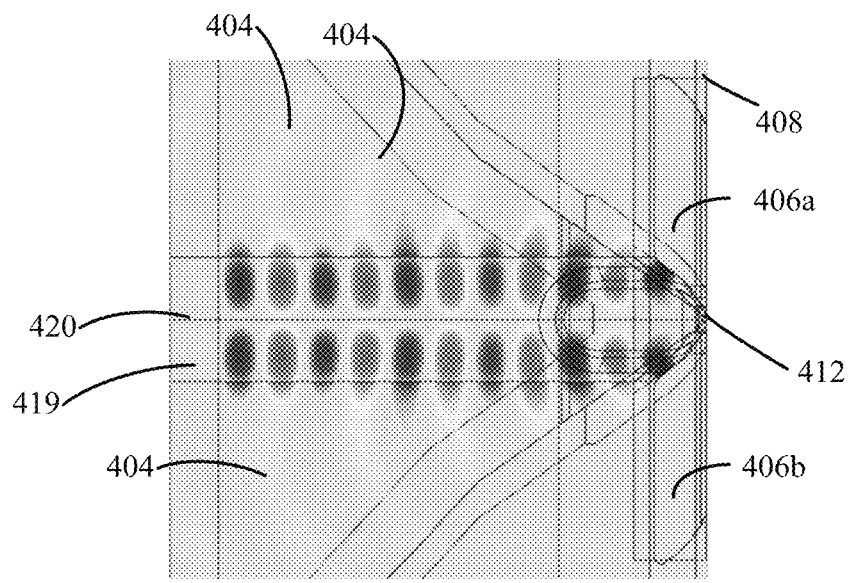
FIG. 4A illustrates incoming light through a waveguide.

FIG. 4A illustrates light incoming to an NFT through a waveguide/waveguide core. The waveguide core 419 guides the light toward the NFT 412, which is positioned proximate the ABS 408 of a recording head. On either side of the NFT 412 is a small solid immersion mirror (referred to herein as a miniSIM or mSIM) where a first part 406a is a mirror image of a second part 406b about a central axis 420 of the waveguide core 419. As may be seen, light entering the waveguide and traveling toward the NFT 412 is aligned about the central axis 420 within the waveguide and with small amounts of light 404 escaping the waveguide core 410.

Figure 4B:
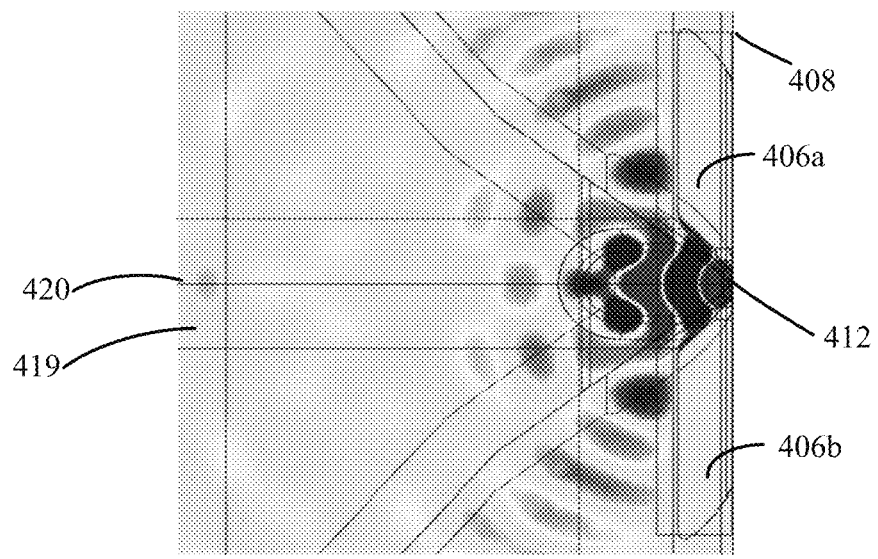
FIG. 4B illustrates reflected light in a waveguide and recording head.

FIG. 4B illustrates the light behavior once the light reaches the NFT 412. While the light is concentrated at, and around, the NFT 412, a significant portion of the light (both TE and TM mode) is reflected and scattered backward from the near-field transducer. This scattered light, especially the light scattered in the cross-track direction, is lost for recording purposes and serves to increase the temperatures of various recoding head components, which may decrease the life span of the recording head. Reflective heatsink structures described herein collect and redirect some, or all, of this scattered light to improve energy efficiency and reduce head temperatures.

Figure 5A:
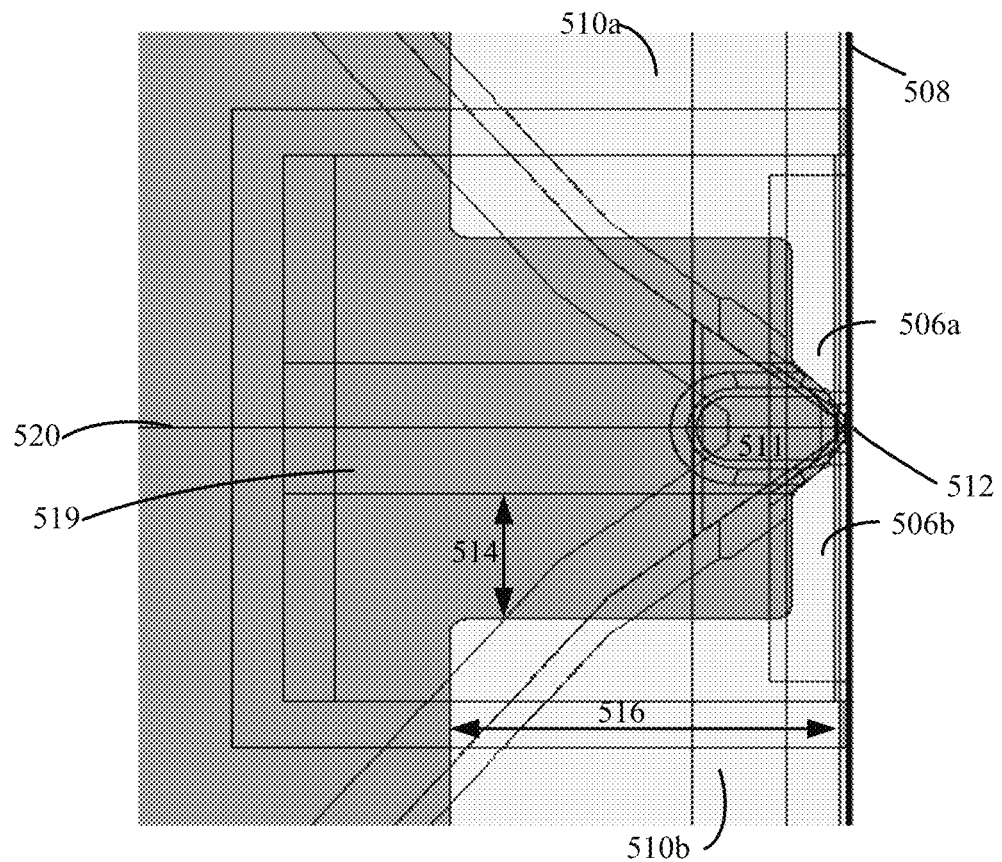
FIGS. 5A-B are top down views of a reflective heatsink structure according to embodiments discussed herein.
Figure 5B:
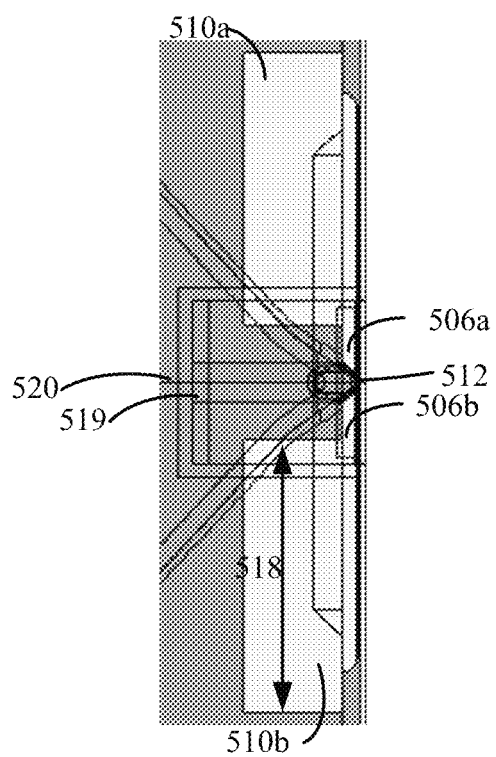

FIGS. 5A-B illustrate top-down views of a reflective heatsink structure in accordance with certain embodiments. A recording head is shown with a waveguide core 519 configured to deliver light to an NFT having an expanded portion 511 and a peg 512. The NFT is substantially centrally aligned with the waveguide core 519 as shown by center line 520. On either side of the NFT peg 512 in the cross-track direction is a portion of a SIM 506a, 506b. The mSIM portions 506a, 506b extend away from the NFT peg 512 substantially parallel to the ABS 508 for a set width. Reflective heatsink structures 510a and 510b couple, respectively, to mSIM portions 506a and 506b. The reflective heatsink structures 510a, b have a rectangular, block shape and are comprised of gold, gold alloys, or other heatsink materials. In certain embodiments, mSIM portions 506a and 506b may use rhodium or gold-rhodium stitched (i.e., Rh near the ABS and inner portion is Au) if the mSIM opening at the ABS 508 is narrow, for example, less than about 170 nm, for keeping increasing thermal gradient. They are coupled to the mSIM portions 506a, b proximate the ABS and extend into the recording head for a certain height indicated by arrow 516. The reflective heatsink structure 510a, b may also optionally be coupled to one or more other heatsink structures such as the heat channel and/or a write pole heatsink to further enhance their heatsinking capabilities. As shown by arrow 518 in FIG. 5B, the reflective heatsink structures 510a, b also extend substantially parallel to the ABS 508 and are recessed from the ABS 508 by the height of the mSIM portions 506a, b, for a width greater than that of mSIM portions 506a and 506b. The reflective heatsink structures 510a, b are also separated from the edge of the waveguide core 519 by a set distance, indicated by arrow 514, and referred to as the core-to-reflective structure distance. The reflective heatsink structures 510a, b, like the mSIM portions 506a, b, are substantially mirror images of each other about center line 520 and the NFT.

The reflective heatsink structures 510a, b reduce temperatures in the recording head and improve efficiency. FIGS. 6A-E illustrate various recording head conditions as functions of various dimensions for the reflective heatsink structures of FIGS. 5A-B. The legend for the various height (e.g., arrow 516 of FIG. 5A) and width (e.g., arrow 518 of FIG. 5B) dimensions of the tested reflective heatsink structures is included with FIG. 6B.

The height and width dimensions are measured in nanometers, for example, W1000_H2000 indicates a reflective heatsink structure (e.g., 510a) having a width of 1,000 nm and a height of 2,000 nm. The two structures having a height of zero nanometers correspond to mSIMs of differing widths only—there is no additional reflective heatsink structure coupled to the mSIMs.

Figure 6A:
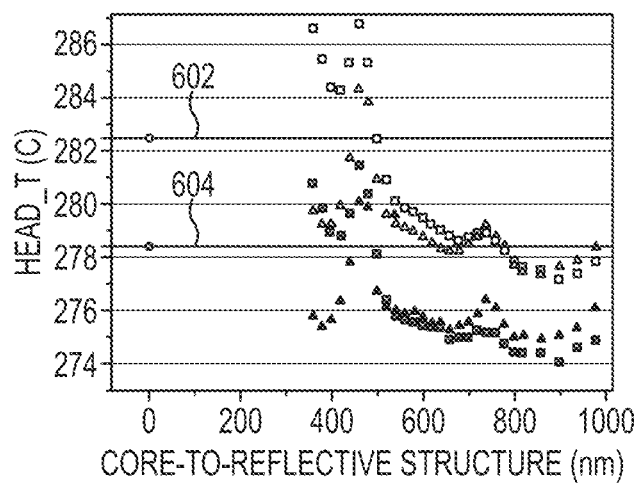
FIG. 6A illustrates the change in head temperature during writing as a function of the distance between the waveguide and a reflective heatsink structure of FIG. 5A having various dimensions.
Figure 6B:
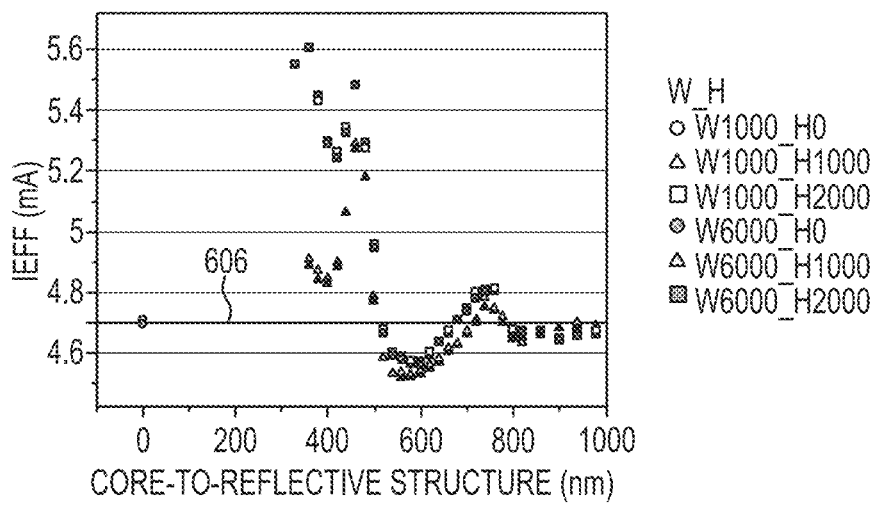
FIG. 6B illustrates the change in laser current required during writing as a function of the distance between the waveguide and a reflective heatsink structure of FIG. 5A having various dimensions.

FIG. 6A illustrates the change in head temperature rise during writing as a function of the distance between the waveguide and the reflective heatsink structure (e.g., arrow 514 of FIG. 5A) for reflective heatsink structures having various height and width dimensions. As set forth above, line 602 indicates the temperature for a recording head having a mSIM with a width of 1,000 nm and no reflective heatsink structures coupled thereto, and line 604 indicates the temperature for a recording head having a mSIM with a width of 6,000 nm and no reflective heatsink structures coupled thereto. FIG. 6B illustrates the change in laser current required for writing as a function of the distance between the waveguide and a reflective heatsink structure (e.g., arrow 514 of FIG. 5A) for reflective heatsink structures having various height and width dimensions. As set forth above, line 606 indicates the effective head current for a recording head having a mSIM with a width of 1,000 nm or 6,000 nm and no reflective heatsink structures coupled thereto.

Figure 6C:
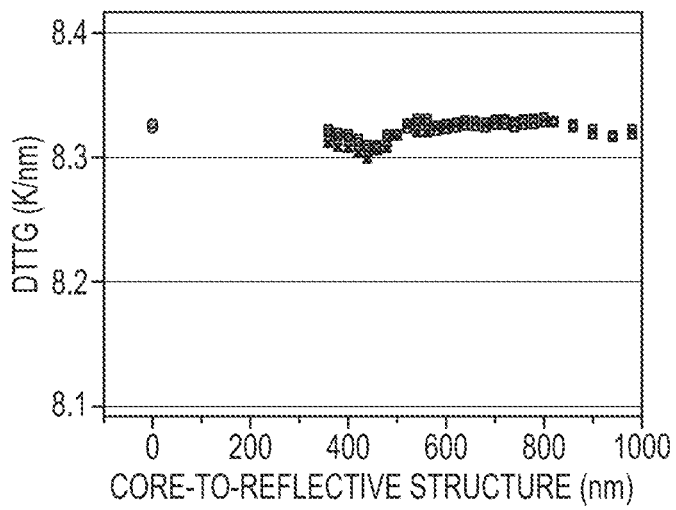
FIG. 6C illustrates the change in down-track thermal gradient along the down-track direction (DTTG) as a function of the distance between the waveguide and a reflective heatsink structure of FIG. 5A having various dimensions.
Figure 6D:
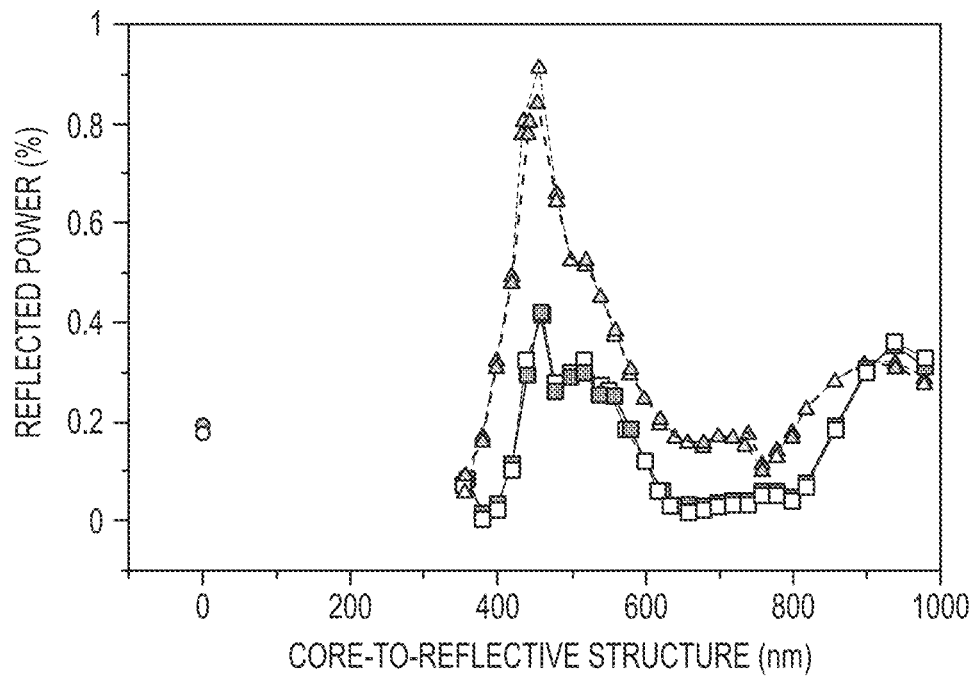
FIG. 6D illustrates the change in reflected power as a function of the distance between the waveguide and a reflective heatsink structure of FIG. 5A having various dimensions.
Figure 6E:
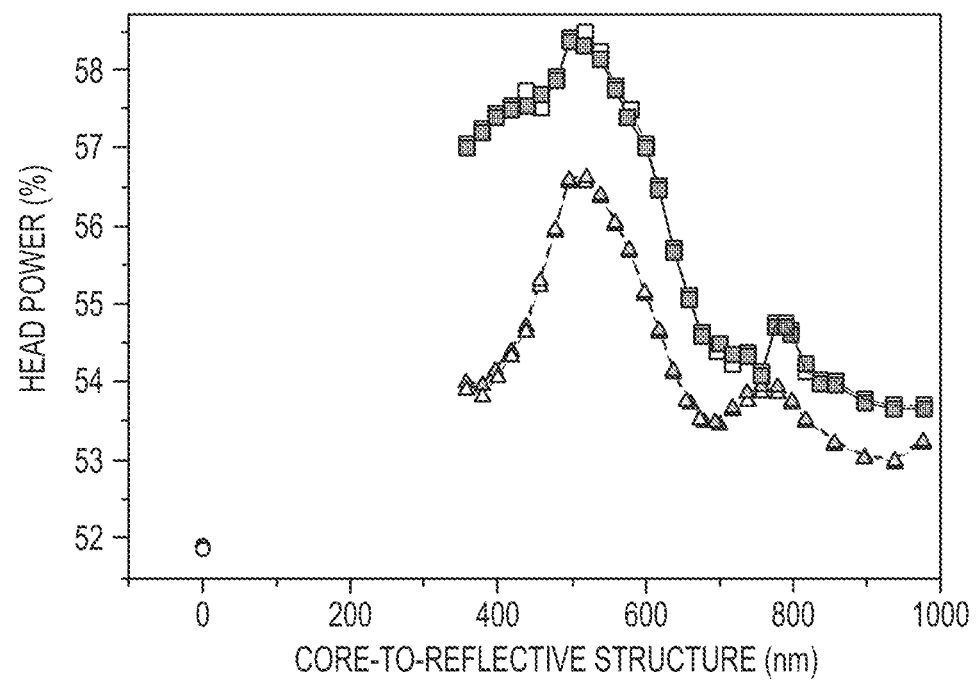
FIG. 6E illustrates the change in head power (back reflections) as a function of the distance between the waveguide and a reflective heatsink structure of FIG. 5A having various dimensions.

FIG. 6C illustrates the change in down-track thermal gradient as a function of the distance between the waveguide and a reflective heatsink structure (e.g., arrow 514 of FIG. 5A) for reflective heatsink structures having various height and width dimensions. FIG. 6D illustrates the change in reflected power (i.e., the back reflection) as a function of the distance between the waveguide and a reflective heatsink structure (e.g., arrow 514 of FIG. 5A) for reflective heatsink structures having various height and width dimensions. FIG. 6E illustrates the change in head power (i.e., the optical power absorbed in the recording head) as a function of the distance between the waveguide and a reflective heatsink structure (e.g., arrow 514 of FIG. 5A) for reflective heatsink structures having various height and width dimensions. In each of FIGS. 6B-E, the mSIMs without a coupled reflective heatsink structure provide substantially similar results.

A comparison of the effects a reflective heatsink structure has on a recording head, as opposed to a recording head without reflective heatsink structures such as shown in FIGS. 5A-B is provided in Table 1 below. The recording head included a bottom reflector, a mSIM having a width of 6,000 nm, and the reflective heatsink structures were positioned at 1,045 nm from the center of the waveguide core. The table illustrates the amount of heatsinking the respective heatsink structures provide without disrupting optical efficiency.

TABLE 1

|  | Head without reflective heatsink structures | Head with reflective heatsink structures |
| --- | --- | --- |
| Head T (° C.) | 278 | 275 |
| TG - Down-track | 8.3 | 8.3 |
| TG - Cross-track | 8.6 | 8.6 |
| IEFF (mA) | 4.7 | 4.6 |
| Reflected Power (%) | 0.19 | 0.12 |
| Head Power (%) | 51.8 | 57.0 |
| Bottom Reflector T (° C.) | 144 | 141 |
| Pole T (° C.) | 80 | 77 |
| mSIM T (° C.) | 69 | 65 |

As shown, inclusion of a reflective heatsink structure decreases the various temperatures of the recording head and overall improves the efficient use of light energy provided for writing. In general, FIGS. 6A-E indicate that the height of the reflective heatsink structures impact overall performance, but the width of the reflective structures does not (at least significantly). Thus, the larger the height of the reflective heatsink structures into the recording head, the better, and the larger the cross-track width, the better, as it will increase the mass for heatsinking purposes and may provide fabrication benefits.

The position of the reflective structure from the center of the waveguide core is measured by dividing the width of the core in half and adding the core-to reflective structure distance. When the core-to reflective structure distance is about 600 nm, as suggested by FIGS. 6A-E, the distance from the waveguide core center is about 1,025 nm, however, this distance may vary depending on the width and type of waveguide core present in the recording head design.

Figure 7:
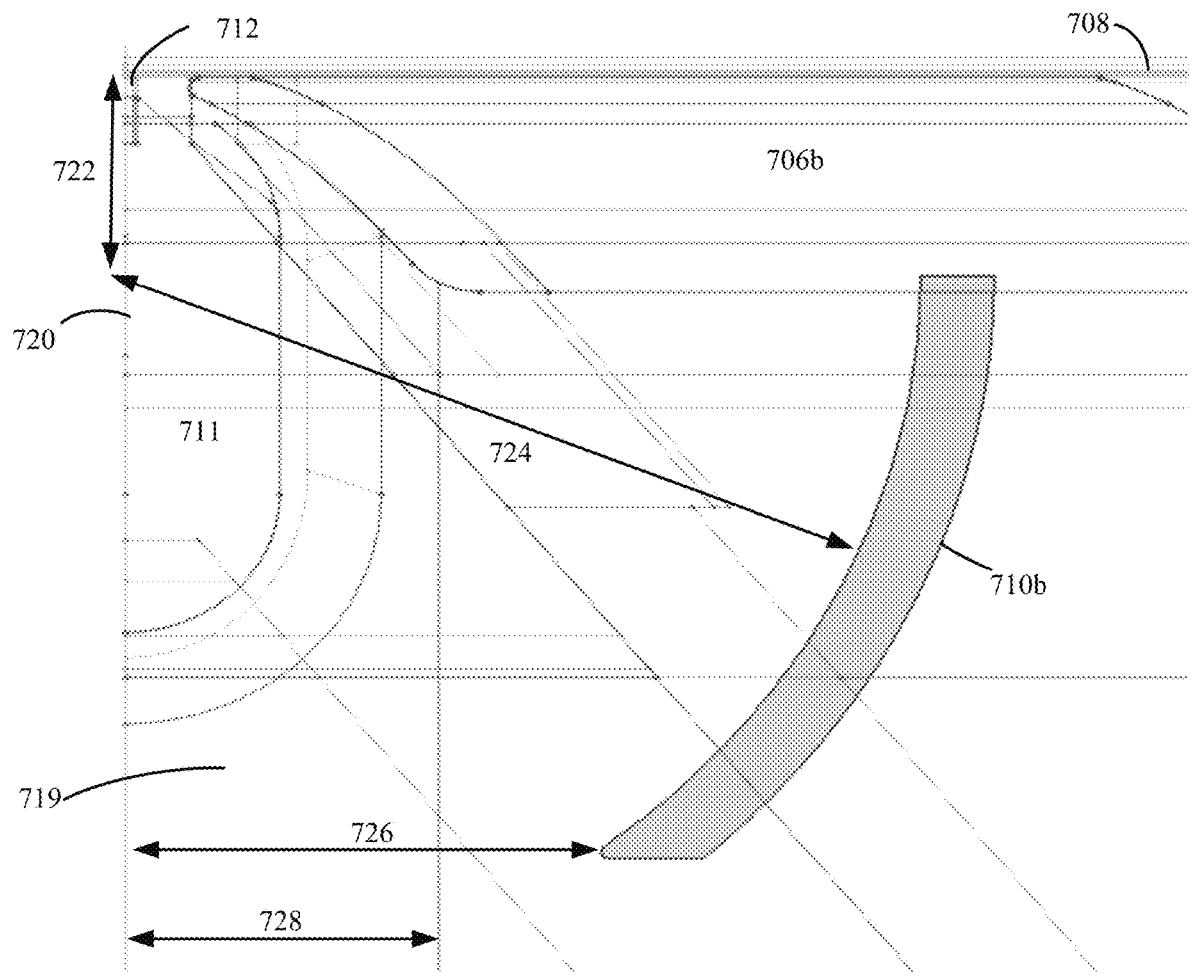
FIG. 7 is a top down view of a reflective heatsink structure according to embodiments discussed herein.

While the rectangular-shaped reflective heatsink structures of FIGS. 5A-B reduced head temperatures and improved performance factors, alternative designs for the reflective heatsink structures may be more effective. FIG. 7 illustrates a reflective heatsink structure according to further embodiments described herein.

The reflective heatsink structure of FIG. 7 includes a curvature to form, at least a portion, of a cavity around the NFT. Similar to above, the recording head includes a waveguide core 719 that is configured to deliver light from an energy source to an NFT comprising an expanded portion 711 and a peg 712 located proximate the ABS 708. Only half of a recording head is shown in FIG. 7; therefore, line 720 is to be understood as a center line dividing the NFT expanded portion 711, peg 712, and waveguide core 719 in half. Thus, mSIM 706b, which extends from the NFT peg 712 substantially parallel to the ABS 708 would have a counterpart mSIM on the opposing side of the NFT peg 712, in the cross-track direction. Likewise, reflective heatsink structure 710b would have a counterpart reflective heatsink structure on the opposing side of the NFT expanded portion 711, in the cross-track direction, that is a substantial mirror image about center line 720.

Unlike the reflective heatsink structures described above, reflective heatsink structure 710b curves toward the waveguide core 719 to partially enclose the NFT. Reflective heatsink structure 710b is also coupled to the mSIM 706b, for example, they lie in the same plane, and may be fabricated together. The reflective heatsink structure 710b is reflective, at least on the inner surface facing the NFT, and may be a mirror comprised of one or more noble metals, such as gold and/or copper and/or one or more dielectric multilayer materials composed of alternative layers having high and low indices of refraction. In certain embodiments, to provide heatsinking to the mSIM 706b, metals of high thermal conductivity may be used. The center of reflective heatsink structure 710b is positioned recessed from the ABS 708, indicated by arrow 722, at a distance about equivalent to the height of the mSIM 706b. However, there may be overlap between the two heatsinking structures 706b, 710b. The degree of curvature of reflective heatsink structure 710b is identified by a radius of a cavity formed by the reflective heatsink structure 710b (along with the counterpart reflective heatsink structure). This radius (R) is indicated with arrow 724 that extends from the central distance that the reflective heatsink structure 710b is recessed from the ABS 708 (indicated by the end of arrow 722 distal the ABS 708) to the inner surface of the reflective heatsink structure 710b.

The curvature of the corresponding reflective heatsink structures form a cavity about the NFT with a transparent opening for entry of the waveguide core 719. Half of the cavity opening is identified with arrow 726, which extends from center line 720 to the distal end of the reflective heatsink structure 710b. As shown, the opening 726 is wider than the width (half of which is shown by arrow 728) of the waveguide core 719. This open, reflective cavity suppresses the NFT radiation by reflecting scattered light back onto the NFT (e.g., NFT expanded portion 711) again. The reflective heatsink structures form a cylindrical mirror, which also provides additional heatsink to the mSIM 706b; thereby reducing mSIM temperature rise and resulting protrusion at the ABS 708.

Figure 8A:
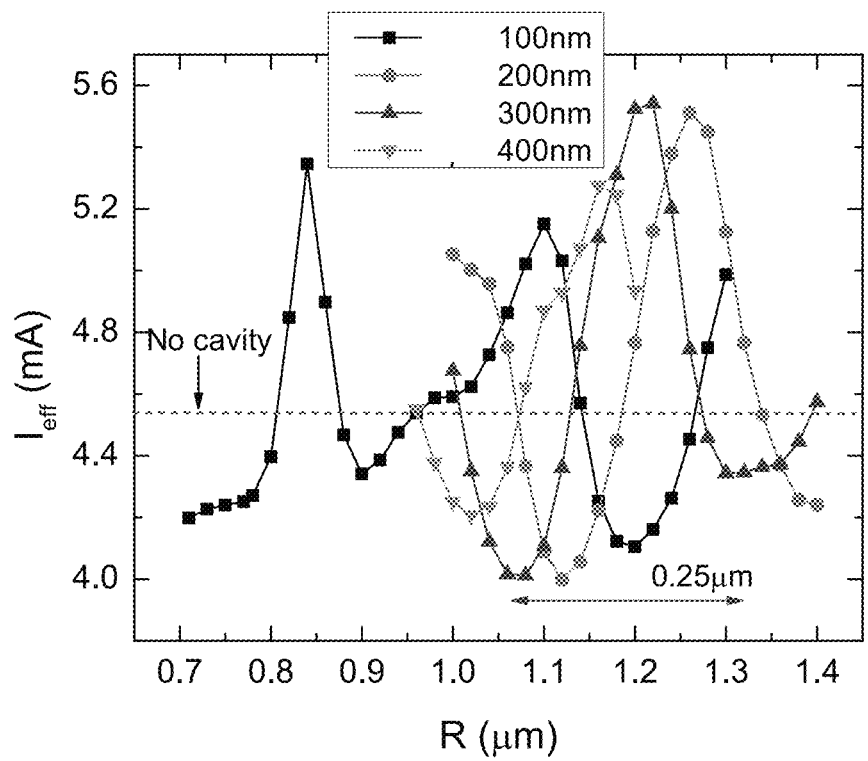
FIG. 8A illustrates the change in laser current required for writing as a function of the distance between a center point and a reflective heatsink structure of FIG. 7 for various center points.
Figure 8B:
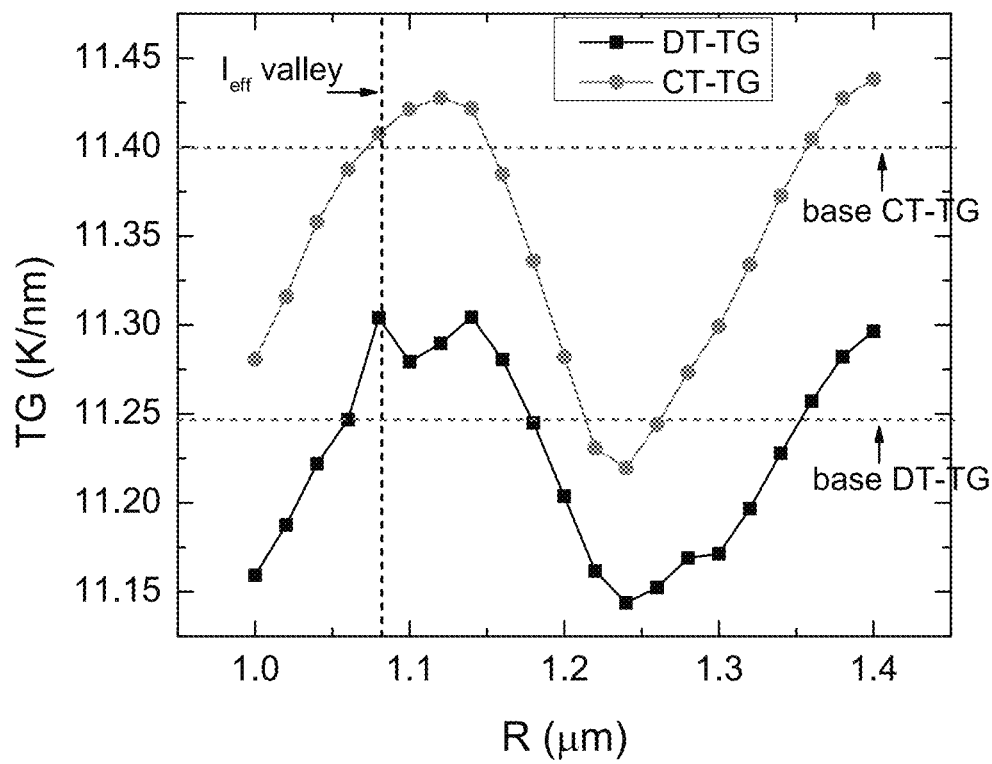
FIG. 8B illustrates the change in thermal gradients (TGs) along the down-track (DT-TG) and cross-track (CT-TG) directions as a function of the distance between a center point and a reflective heatsink structure of FIG. 7 for various center points.

FIGS. 8A-B illustrate modeled results for a reflective heatsink structure as shown in FIG. 7 and having various dimensions. The modeling used a gold-rhodium stitched mSIM with an opening of 170 nm near the ABS and a peg having a width and height of 30 nm each. The distal opening in the reflective heatsink structure (half of which is indicated by arrow 726 in FIG. 7) is 1.25 μm; however, this opening distance would vary based on the size and type of waveguide present in the recording head. FIG. 8A illustrates the change in laser power (Ieff) required for writing as a function of a change in the radius of curvature (indicated by arrow 724 in FIG. 7) of the reflective heatsink structure. The respective sets of results, as shown in the legend, represent data points for reflective heatsink structures having various central positions recessed from the ABS, indicated by arrow 722 in FIG. 7, including 100 nm, 200 nm, 300 nm, and 400 nm. The dashed horizontal line across FIG. 8A indicates the laser power when a reflective heatsink structure is not present. However, the presence of a reflective heatsink structure causes the laser power to oscillate with a period of $\lambda_0/(2n(AlOx))$. Here, n(AlOx) denotes the index of refraction of the cladding material surrounding the waveguide core 719. Since using less laser power increases efficiency, the lower the laser power in FIG. 8A, the better. Thus, the central position of the reflective heatsink structure is preferably positioned about 200-300 nm recessed from the ABS. This provides up to a 13% reduction in laser diode current with near-field enhancement.

FIG. 8B illustrates the change in thermal gradient, both down-track (DT-TG) and cross-track (CT-TG) as a function of a change in the radius of curvature (indicated by arrow 724 in FIG. 7) of a reflective heatsink structure having a central position recessed about 300 nm from the ABS. The two horizontal dashed lines across FIG. 8B indicate the base thermal gradients when a reflective heatsink structure is not present. The vertical dashed line at a radius of about 1.8 μm indicates the radius indicated in FIG. 8A corresponding to a low point of laser power for a reflective heatsink structure having a central position recessed about 300 nm from the ABS. The tracking of the thermal gradients with laser power data of FIG. 8A may indicate the presence of a thermal background.

Figure 9A:
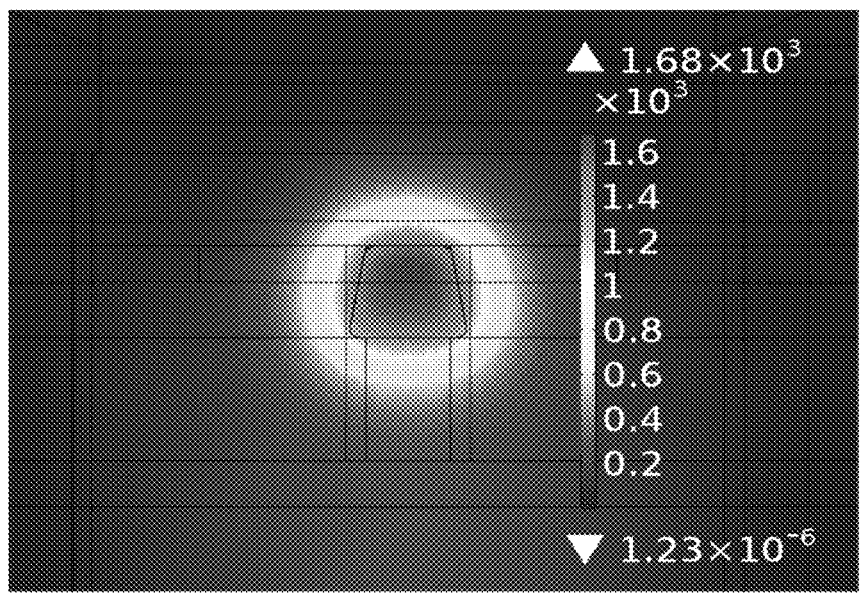
FIG. 9A is a thermal diagram showing resistive heat in a magnetic medium recording layer in connection with a recording head without a reflective heatsink structure.
Figure 9B:
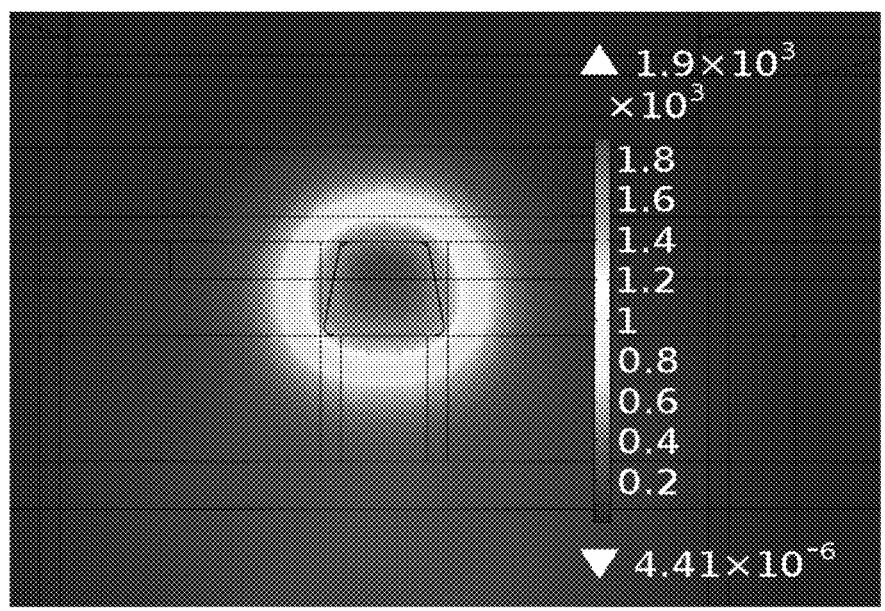
FIG. 9B is a thermal diagram showing resistive heat in a magnetic medium recording layer in connection with a recording head having a reflective heatsink structure according to embodiments discussed herein.

Writing operations of a recording head occur in connection with a corresponding recording medium. FIGS. 9A-B illustrate the resistive heat density (i.e., the Joule heat) in the recording layer of a corresponding recording medium. FIG. 9A illustrates the resistive heat in a recording layer when the recording head does not include a reflective heatsink structure (i.e., light is scattered), and FIG. 9B illustrates the resistive heat in a recording layer when the recording head includes a reflective heatsink structure as shown in FIG. 7. While the size and shape of the hot spot do not vary much between the two figures, the hot spot of FIG. 9B can be seen as achieving higher temperatures due to the reflection and reuse of the scattered light. Thus, placing the NFT within a reflective heatsink structure suppresses NFT radiation. Coupling that reflective structure to a mSIM also improves NFT performance by reducing necessary laser power and temperature in the head and increases the temperature in the corresponding recording medium.

Figure 10A:
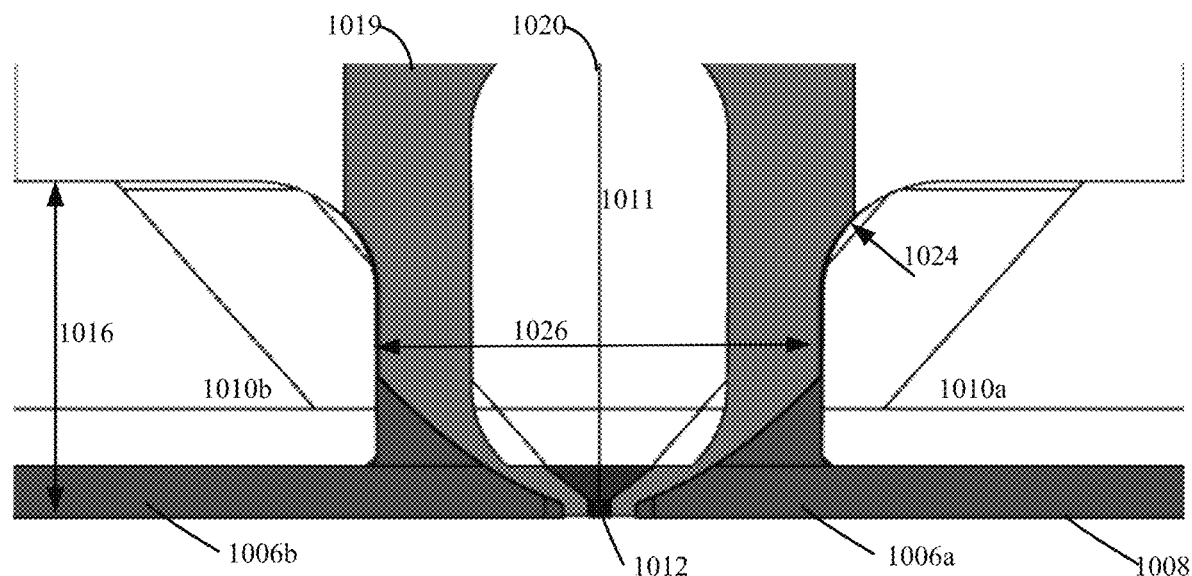
FIG. 10A is a top down view of a reflective heatsink structure according to embodiments discussed herein.

In further embodiments, a reflective heatsink structure may be configured as shown in FIGS. 10A-E. FIG. 10A shows a top-down view of a recording head having an alternative configuration of a reflective heatsink structure. The recording head includes a waveguide core 1019 with an NFT having an expanded portion 1011 and a peg 1012 centrally aligned with the waveguide core 1019 along a center line 1020. On either side of the NFT peg 1012, are mSIM portions 1006a, b extending along the ABS 1008. Similar to above, the reflective heatsink structure 1010a, b includes a portion on each side of the waveguide core 1019, and each side is a substantial mirror image of each other. Each portion of the reflective heatsink structure 1010a, b is spaced apart from the expanded portion of the NFT 1011. The reflective heatsink structures 1010a, b have a distance between them defining an opening in the reflective heatsink structure 1010a, b indicated by arrow 1026. The reflective heatsink structures extend from the mSIM 1006a, b respectively for a distance substantially perpendicular to the ABS 1008 for a height indicated by arrow 1016. Although the reflective heatsink structures 1010a, b are coupled to the respective mSIM portions 1006a, b, the height of the reflective heatsink structures 1016 is measured from the ABS 1008 to the distal surface of the reflective heatsink structures 1010a, b. Notably, the height 1016 of the reflective heatsink structures 1010a, b is less than the distance that the NFT expanded portion 1011 extends into the recording head. Each reflective heatsink structure also includes a curved portion providing a rounded shape from the surface closest to the NFT toward the distal surface. This curved portion is referred to as a radius of curvature and is indicated by arrow 1024.

While the reflective heatsink structure 1010a, b of FIG. 10A may be coupled to a variety of mSIM structure designs along the ABS of a recording head, it provides additional advantages when coupled to an mSIM comprised of rhodium. Rhodium is used in mSIM structures because it provides a minimal, or non-existing, thermal gradient role over when the mSIM opening becomes narrower. However, this increases the laser power requirement to achieve recording temperatures in the recording media, which also causes high head temperatures leading to large laser induced head protrusion. The rhodium mSIM has inefficient optical interaction, which causes laser power to be wasted and unnecessarily increase the temperature of the mSIM and surrounding materials. Reflective heatsink structures as shown in FIG. 10A introduce low loss and high thermal conductivity materials (e.g., gold) in a structure on top and behind the mSIM to optically interact with the light by blocking light from interacting with the rhodium mSIM. This reflects light toward the NFT as well as cools the mSIM by improving heat dissipation. The reflective heatsink structure may also be coupled with one or more additional heatsink structures to further reduce the temperature of surrounding head components.

Figure 10B:
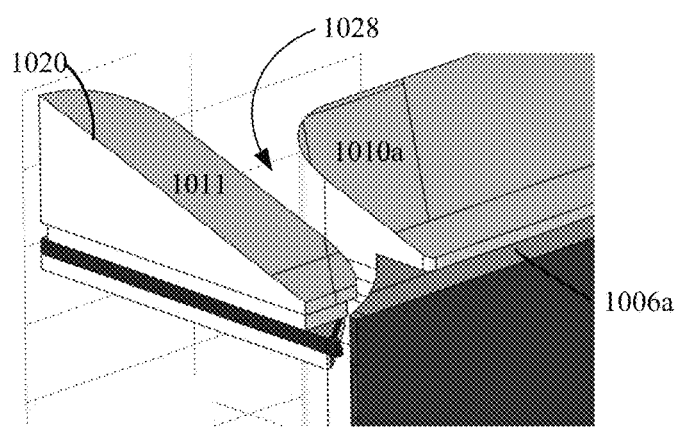
FIG. 10B is a perspective view of part of the heatsink structure of FIG. 10A in connection with the near-field transducer according to embodiments discussed herein.
Figure 10C:
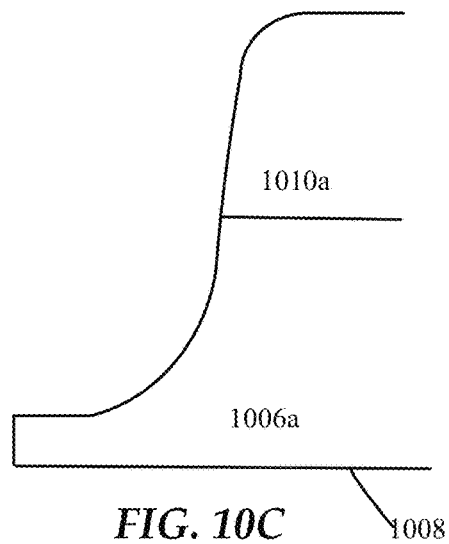
FIG. 10C is a top-down, planar view of the transition between a solid immersion mirror portion and a reflective heatsink structure according to embodiments discussed herein.
Figure 10D:
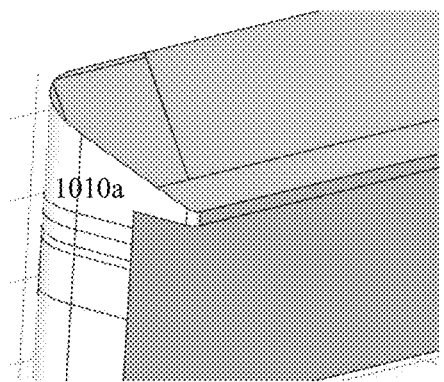
FIG. 10D is a perspective view of part of the heatsink structure of FIG. 10A according to embodiments discussed herein.

The reflective heatsink structure 1010*a, b* of FIG. 10A is shown in relation to other head components in FIGS. 10B-E. FIG. 10B provides a perspective view of half of the reflective heatsink structure 1010*a* in relation to half of the NFT, in particular the NFT expanded portion 1011, and half of the mSIM 1006*a*. As mentioned above, the reflective heatsink structure 1010*a* is spaced apart from the NFT, which is shown by the gap 1028 between the reflective heatsink structure 1010*a* and the NFT expanded portion 1011. As shown in the perspective view of FIG. 10D, the reflective heatsink is positioned on top and behind (i.e., within the recording head) an mSIM portion. When fabricating the head, the reflective heatsink structure is processed after mSIM formation for easier wafer processing with an added pattern to an existing photomask. In certain embodiments, the reflective heatsink structure is formed having a smooth transition in the cross-track direction with the mSIM. This is shown in the top-down planar view of FIG. 10C, which shows a continuous, shared surface facing the NFT. Thus, the interface between a gold reflective heatsink structure 1010*a* and a rhodium mSIM 1006*a* fits, or continues, the curvature of the surface facing the NFT that begins with the mSIM.

Figure 10E:
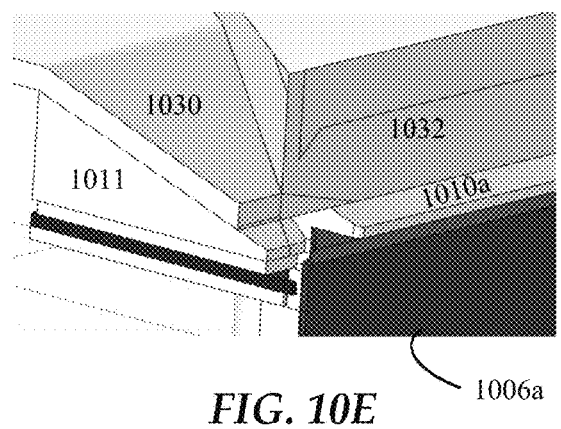
FIG. 10E is a perspective view of part of the heatsink structure of FIG. 10A in connection with neighboring heatsink structures according to embodiments discussed herein.

As mentioned above, the reflective heatsink structure 1010*a, b* may be coupled to additional heatsinking structures, as shown in FIG. 10E. FIG. 10E illustrates the inclusion of a diffuser 1030 and the heat channel 1032 to the structures shown in FIG. 10A. The coupling to additional heatsinking structures along with the reflective steering of light back to more efficiently excite the NFT and minimize the light reflected back to the laser reduces the head temperature and the laser power requirement, in certain embodiments, down to 5 mW or lower. Additional operational trends for reflective heatsink structures as illustrated in FIG. 10A are shown in the following figures.

FIGS. 11A-D illustrate a large-scale scan of various reflective heatsink structure openings (i.e., the dimension illustrated by arrow 1026 in FIG. 10A) for a reflective heatsink structure having two different heights (i.e., the dimension illustrated by arrow 1016 in FIG. 10A). The data identified as 1102 corresponds to a reflective heatsink structure having a height of 495 nm, and the data identified as 1104 corresponds to a reflective heatsink structure having a height of 595 nm. The horizontal dashed line in each figure represents a baseline value for a recording head without a reflective heatsink structure. The solid vertical line in each figure represents the width of the waveguide core (about 0.85 μm). Thus, any data to the left of the line in each figure represents an opening in the reflective heatsink structure that is smaller than the width of the waveguide core.

Figure 11A:
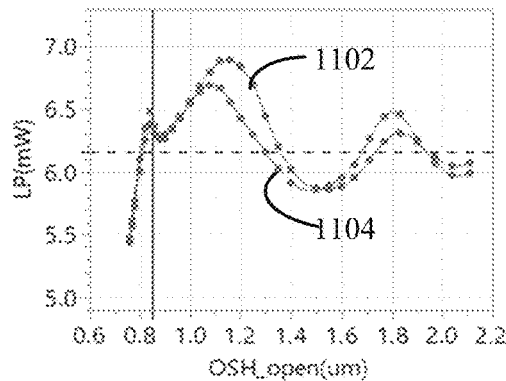
FIG. 11A illustrates the change in laser power (LP) required for writing as a function of the distance between the reflective heatsink structures of FIG. 10A having different height dimensions.
Figure 11B:
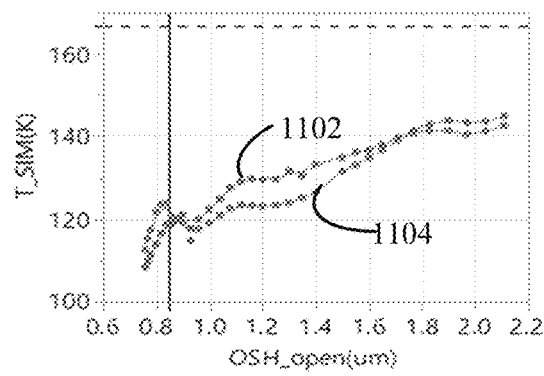
FIG. 11B illustrates the change in solid immersion mirror temperature as a function of the distance between the reflective heatsink structures of FIG. 10A having different height dimensions.
Figure 11C:
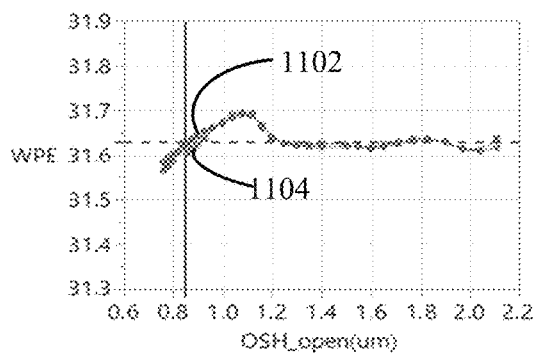
FIG. 11C illustrates the change in track width as a function of the distance between the reflective heatsink structures of FIG. 10A having different height dimensions.
Figure 11D:
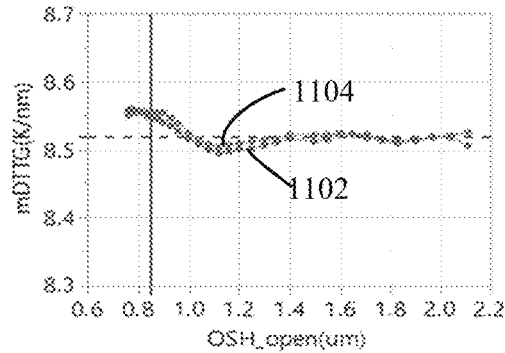
FIG. 11D illustrates the change in down-track thermal gradient in maximum areal density capability condition, mDTTG, as a function of the distance between the reflective heatsink structures of FIG. 10A having different height dimensions.

FIG. 11A illustrates the change in laser power as a function of the size of the opening, where a baseline laser power would be 6.16 mW, and FIG. 11B illustrates the change in mSIM temperature as a function of the size of the opening, where a baseline temperature would be 166 K. FIG. 11C illustrates the change in track width (write-plus-erasure, WPE) as a function of the size of the opening, where a baseline track width would be 31.6 nm, and FIG. 11D illustrates the change in down-track thermal gradient as a function of the size of the opening, where a baseline thermal gradient would be 8.5 K/nm. The data shows that the laser power shows a periodic trend as the size of the reflective heatsink structure opening changes, but that trend abruptly switches to a sharp transition once the opening meets the waveguide core width. Also, the temperature of the mSIM gradually decreases as the opening gets narrower while there is minimal variation for the track width and thermal gradients. The data of FIGS. 11C-D indicate that the presence of the reflective heatsink structure does not negatively impact writing performance as the data is consistent with the baseline performance.

Figure 12A:
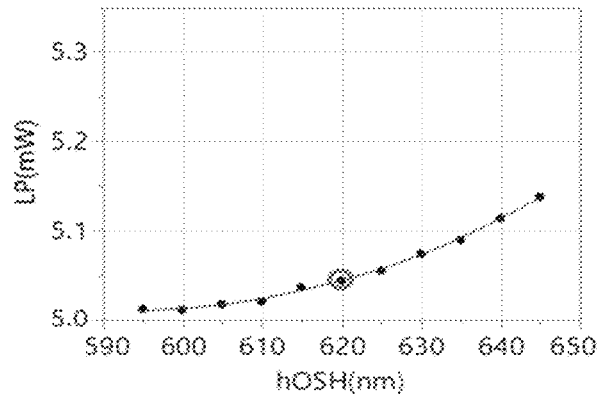
FIG. 12A illustrates the change in laser power required for writing as a function of the height of the reflective heatsink structures of FIG. 10A.
Figure 12B:
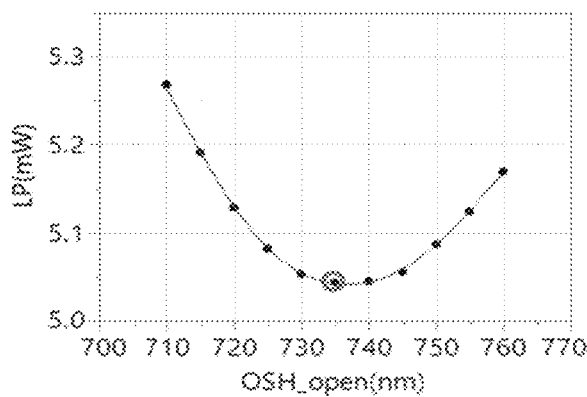
FIG. 12B illustrates the change in laser power as a function of the distance between the reflective heatsink structures of FIG. 10A.
Figure 12C:
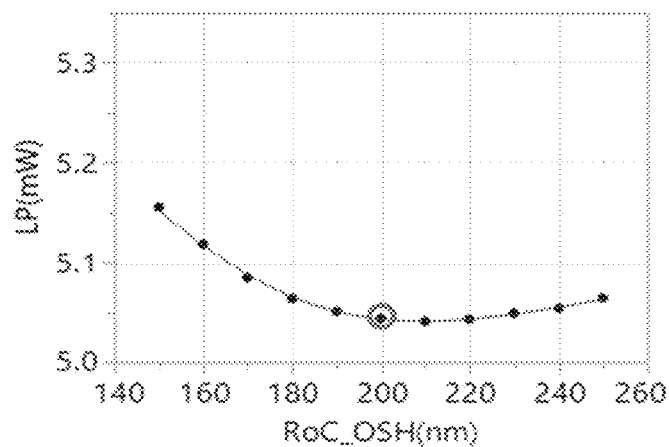
FIG. 12C illustrates the change in laser power as a function of the radius of curvature of the reflective heatsink structures of FIG. 10A.

In addition, various performance parameters were tested with each of the three dimensions of the reflective heatsink structure of FIG. 10A for a recording head design. FIG. 12A illustrates the change in laser power as a function of the height of the reflective heatsink structure (i.e., the dimension illustrated by arrow 1016 in FIG. 10A). FIG. 12B illustrates the change in laser power as a function of the size of the opening between the reflective heatsink structures (i.e., the dimension illustrated by arrow 1026 in FIG. 10A), and FIG. 12C illustrates the change in laser power as a function of the radius of curvature of the reflective heatsink structure (i.e., the dimension illustrated by arrow 1024 in FIG. 10A). As mentioned above, the baseline laser power requirement for the recording head design without a reflective heatsink structure would be 6.16 mW, and the circled data point in each of FIGS. 12A-C identifies an achievable laser power requirement of 5.04 mW.

Figure 13A:
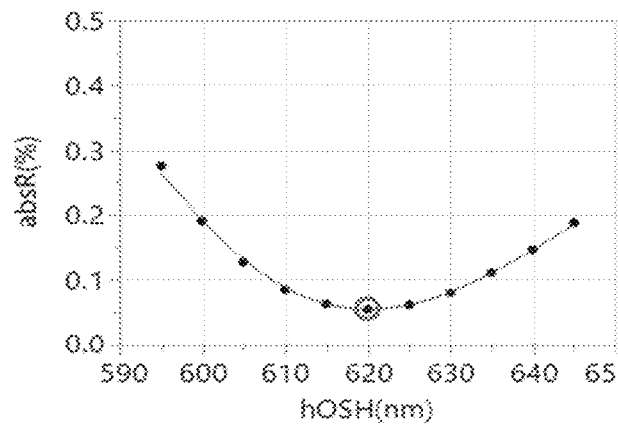
FIG. 13A illustrates the change in percentage of light reflected from the head as a function of the height of the reflective heatsink structures of FIG. 10A.
Figure 13B:
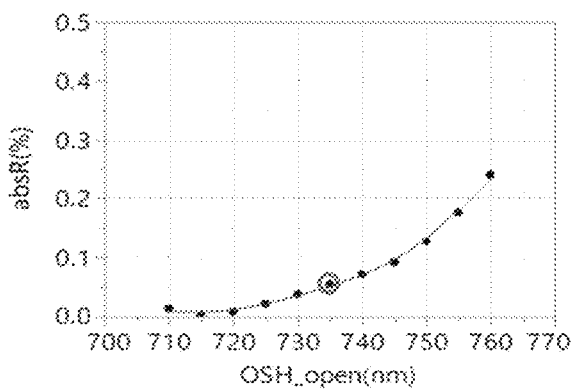
FIG. 13B illustrates the change in percentage of light reflected from the head as a function of the distance between the reflective heatsink structures of FIG. 10A.
Figure 13C:
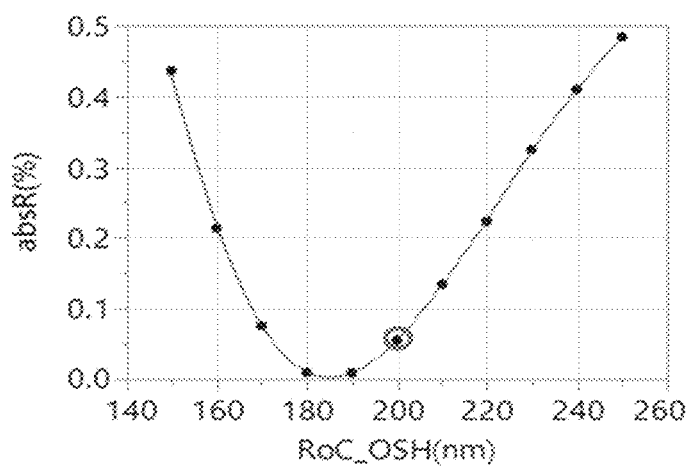
FIG. 13C illustrates the change in percentage of light reflected from the head as a function of the radius of curvature of the reflective heatsink structures of FIG. 10A.

Similarly, the percentage of light reflected from the ABS for the same recording head design was tested with respect to the various dimensions. FIG. 13A illustrates the change in percentage of light reflected at the air-bearing surface as a function of the height of the reflective heatsink structure (i.e., the dimension illustrated by arrow 1016 in FIG. 10A). FIG. 13B illustrates the change in percentage of light reflected at the air-bearing surface as a function of the size of the opening between the reflective heatsink structures (i.e., the dimension illustrated by arrow 1026 in FIG. 10A), and FIG. 13C illustrates the change in percentage of light reflected at the air-bearing surface as a function of the radius of curvature of the reflective heatsink structure (i.e., the dimension illustrated by arrow 1024 in FIG. 10A). The baseline percentage of light reflected at the air-bearing surface for the recording head design without a reflective heatsink structure would be 0.21%, and the circled data point in each of FIGS. 13A-C identifies an achievable percentage of light reflected at the air-bearing surface of 0.6%. This circled data point also corresponds to the same dimensions identified above in FIGS. 12A-C for the circled data points.

Figure 14A:
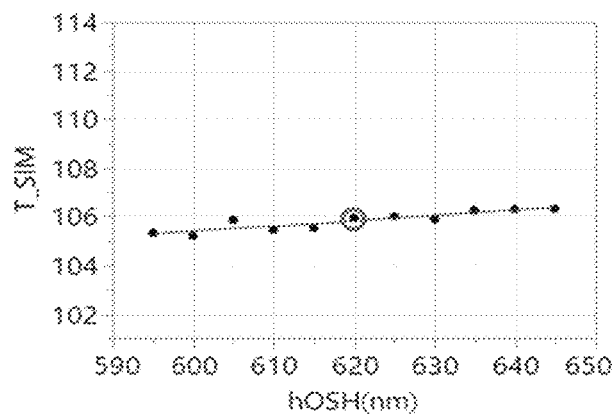
FIG. 14A illustrates the solid immersion mirror temperature as a function of the height of the reflective heatsink structures of FIG. 10A.
Figure 14B:
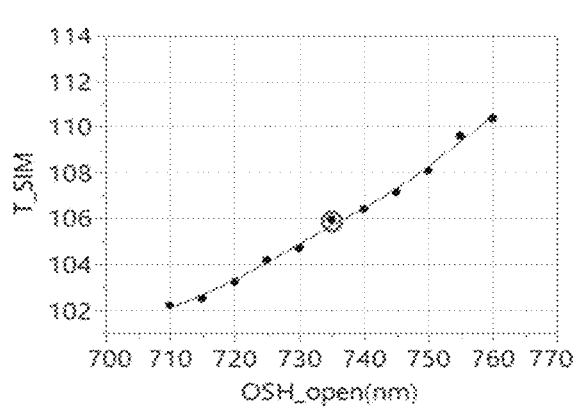
FIG. 14B illustrates the solid immersion mirror temperature as a function of the distance between the reflective heatsink structures of FIG. 10A.
Figure 14C:
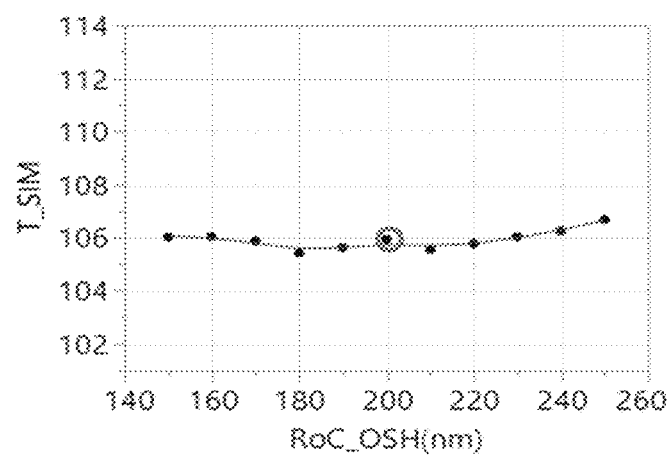
FIG. 14C illustrates the solid immersion mirror temperature as a function of the radius of curvature of the reflective heatsink structures of FIG. 10A.

The temperature of the mSIM for the same recording head design was also tested with respect to the various dimensions. FIG. 14A illustrates the change in temperature as a function of the height of the reflective heatsink structure (i.e., the dimension illustrated by arrow 1016 in FIG. 10A). FIG. 14B illustrates the change in temperature as a function of the size of the opening between the reflective heatsink structures (i.e., the dimension illustrated by arrow 1026 in FIG. 10A), and FIG. 14C illustrates the change in temperature as a function of the radius of curvature of the reflective heatsink structure (i.e., the dimension illustrated by arrow 1024 in FIG. 10A). As mentioned above, the baseline temperature for the recording head design without a reflective heatsink structure would be 166 K, and the circled data point in each of FIGS. 14A-C identifies an achievable temperature of 106 K. This circled data point also corresponds to the same dimensions identified above in FIGS. 12A-C and 13A-C.

Figure 15A:
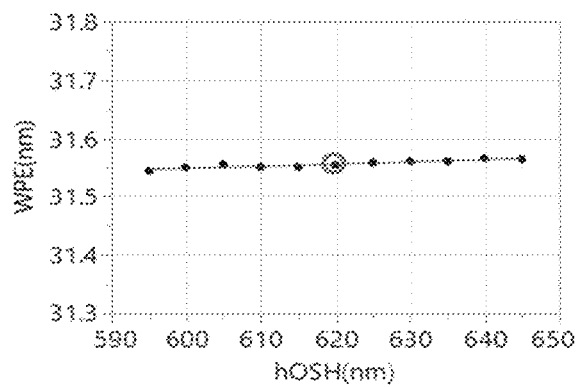
FIG. 15A illustrates the track width as a function of the height of the reflective heatsink structures of FIG. 10A.
Figure 15B:
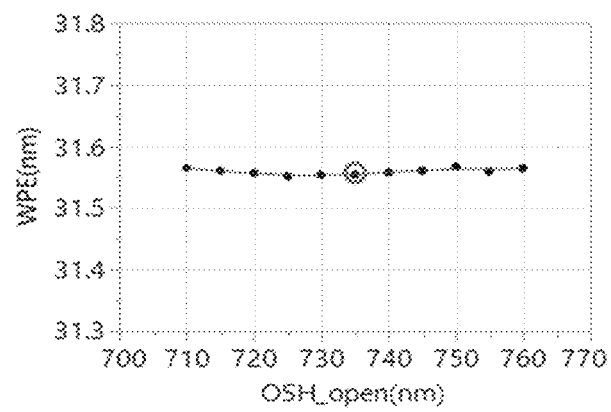
FIG. 15B illustrates the track width as a function of the distance between the reflective heatsink structures of FIG. 10A.
Figure 15C:
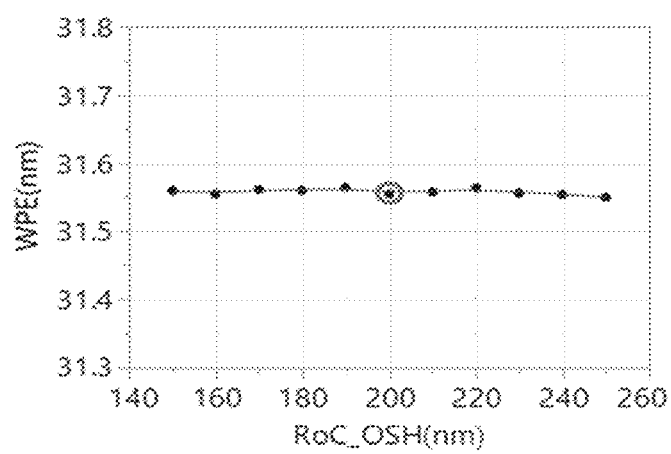
FIG. 15C illustrates the track width as a function of the radius of curvature of the reflective heatsink structures of FIG. 10A.

The track width for the same recording head design was also tested with respect to the various dimensions. FIG. 15A illustrates the change in track width as a function of the height of the reflective heatsink structure (i.e., the dimension illustrated by arrow 1016 in FIG. 10A). FIG. 15B illustrates the change in track width as a function of the size of the opening between the reflective heatsink structures (i.e., the dimension illustrated by arrow 1026 in FIG. 10A), and FIG. 15C illustrates the change in track width as a function of the radius of curvature of the reflective heatsink structure (i.e., the dimension illustrated by arrow 1024 in FIG. 10A). As mentioned above, the baseline track width for the recording head design without a reflective heatsink structure would be 31.6 nm, and the circled data point in each of FIGS. 15A-C identifies a substantially similar track width at each of the same dimensions identified above in FIGS. 12A-C, 13A-C, and 14A-C.

Figure 16C:
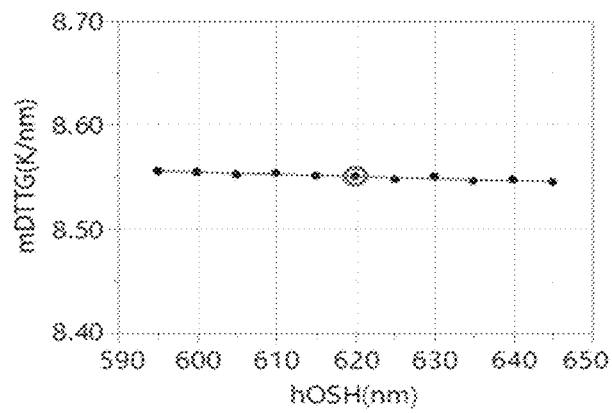
FIG. 16C illustrates the down-track thermal gradient as a function of the radius of curvature of the reflective heatsink structures of FIG. 10A.
Figure 16C:
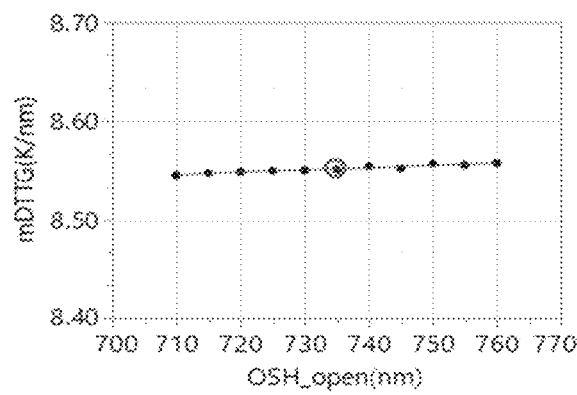
Figure 16C:
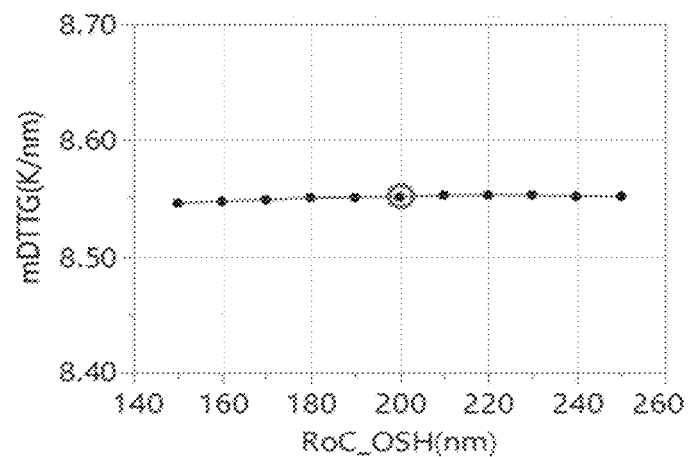

The down-track thermal gradient for the same recording head design was also tested with respect to the various dimensions. FIG. 16A illustrates the change in down-track thermal gradient as a function of the height of the reflective heatsink structure (i.e., the dimension illustrated by arrow 1016 in FIG. 10A). FIG. 16B illustrates the change in down-track thermal gradient as a function of the size of the opening between the reflective heatsink structures (i.e., the dimension illustrated by arrow 1026 in FIG. 10A), and FIG. 16C illustrates the change in down-track thermal gradient as a function of the radius of curvature of the reflective heatsink structure (i.e., the dimension illustrated by arrow 1024 in FIG. 10A). As mentioned above, the baseline down-track thermal gradient for the recording head design without a reflective heatsink structure would be 8.5 K/nm, and the circled data point in each of FIGS. 16A-C identifies a substantially similar down-track thermal gradient of about 8.55 K/nm at each of the same dimensions identified above in FIGS. 12A-C, 13A-C, 14A-C, and 15A-C.

The results of the data illustrated in FIGS. 12A-16C are summarized below in Table 2. Table 2 includes the baseline parameters for a head without a reflective heatsink structure, the demonstrated parameters for the same head design including a reflective heatsink structure as shown in FIG. 10A, and parameters demonstrated for a second head design that includes a reflective heatsink structure as shown in FIG. 10A.

TABLE 2

|  | Head Design 1 without reflective heatsink structures | Head Design 1 with reflective heatsink structures | Head Design 2 with reflective heatsink structures |
| --- | --- | --- | --- |
| Laser Power (mW) | 6.16 | 5.04 | 4.97 |
| ABS Reflection (%) | 0.21 | 0.06 | 0.01 |
| mSIM T (K) | 166 | 106 | 164 |
| Peg T (K) | 398 | 383 | 321 |
| Pole T (K) | 108 | 81 | 72 |
| Sunken Disc T (K) | 208 | 192 | 174 |
| WPE (nm) | 31.6 | 31.6 | 31.6 |
| TG - Down-track (K/nm) | 8.5 | 8.55 | 9.4 |
| TG - Cross-track (K/nm) | 8.1 | 8.1 | 8.8 |

As indicated by the circled data points, certain dimensions for a reflective heatsink structure were identified to provide the above operating parameters for a head having the first design. Similarly, dimensions for a recording head having the second design were identified to provide the above operating parameters. The dimensions for reflective heatsink structures according to FIG. 10A and in accordance with certain embodiments are summarized in Table 3 below.

TABLE 3

|  | Head Design 1 | Head Design 2 |
| --- | --- | --- |
| Height (nm) | 620 | 655 |
| Opening (nm) | 735 | 750 |
| Radius of Curvature (nm) | 200 | 170 |

Thus, reflective heatsink structures as illustrated in FIG. 10A may be introduced to various head designs with dimensions adapted for the respective designs. Notably, the reflective heatsink structure has a demonstrated ability to reduce the, or provide a low, laser power requirement for multiple head designs.

In summary, embodiments described herein provide reflective heatsink structures to suppress light scattering, increase waveguide-NFT coupling, and/or block light from interacting with certain recording head components. These structures improve NFT performance, as well as overall recording head performance, by reflecting/steering scattered light back toward the NFT to capture the otherwise wasted light and enhance the generated near field. This reduces the optical power required for writing operations and reduces current-induced effects on head temperatures, including reduced protrusion at the ABS. These efficiencies prolong the lifetime of the recording head and improve overall reliability in writing operations.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:
1. A recording head, comprising:
a waveguide core extending to an air-bearing surface;
a near-field transducer centrally aligned with the waveguide core and positioned proximate a first side of the waveguide core in a down-track direction;
first and second mirror portions forming a mirror and surrounding the near-field transducer in a cross-track direction with a gap therebetween, the mirror extending in the direction normal to the air-bearing surface a first distance that is less than a second distance that the near-field transducer extends in the direction normal to the air-bearing surface; and first and second reflective heatsink structures respectively coupled to the first and second mirror portions, the heatsink structures spaced apart from the near-field transducer in the cross-track direction and extending in a direction normal to the air-bearing surface such that proximate the air-bearing surface the first and second reflective heatsink structures extend substantially parallel to, or converge toward, each other.

2. The recording head of claim 1, wherein each of the first and second reflective heatsink structures have a rectangular shape.

3. The recording head of claim 1, wherein each of the first and second reflective heatsink structures have a quarter-cylindrical shape curving toward the waveguide core.

4. The recording head of claim 3, wherein the first and second reflective heatsink structures form a cavity encompassing the near-field transducer, wherein the cavity includes a gap distal the air-bearing surface encompassing the waveguide core.

5. The recording head of claim 1, wherein the first and second reflective heatsink structures each have an edge distal the air-bearing surface and there is a gap between the first and second distal edges, wherein the waveguide core is positioned in the gap.

6. The recording head of claim 5, wherein the first and second reflective heatsink structures are each spaced apart from an edge of the waveguide core.

7. The recording head of claim 1, wherein the first and second reflective heatsink structures extend in the direction normal to the air-bearing surface a third distance that is less than the second distance and greater than the first distance.

8. The recording head of claim 7, wherein the first and second reflective heatsink structures are separated by a gap having a width less than a width of the waveguide core.

9. The recording head of claim 1, wherein the first and second reflective heatsink structures are substantially mirror images of each other.

10. A recording head, comprising:
a waveguide core extending to an air-bearing surface;
a near-field transducer centrally aligned with the waveguide core and positioned proximate a first side of the waveguide core in a down-track direction;
first and second mirror portions forming a mirror and surrounding the near-field transducer in a cross-track direction with a gap therebetween, the mirror extending in the direction normal to the air-bearing surface a first distance that is less than a second distance that the near-field transducer extends in the direction normal to the air-bearing surface; and
first and second reflective heatsink structures respectively coupled to the first and second mirror portions, the reflective heatsink structures spaced apart from the near-field transducer in the cross-track direction and extending in a direction normal to the air-bearing surface having a third distance between the first and second structures proximate the air-bearing surface and a fourth distance between the first and second structures distal the air-bearing surface, wherein the fourth distance is equal to or smaller than the third distance.

11. The recording head of claim 10, wherein each of the first and second reflective heatsink structures have a rectangular shape.

12. The recording head of claim 10, wherein each of the first and second reflective heatsink structures have a quarter-cylindrical shape and the fourth distance is smaller than the third distance.

13. The recording head of claim 12, wherein the first and second reflective heatsink structures have a first edge proximate the air-bearing surface and the first edge is positioned a distance about 200-300 nm away from the air-bearing surface and within the recording head.

14. The recording head of claim 12, wherein the first and second reflective heatsink structures form a cavity encompassing the near-field transducer, wherein the fourth distance is greater than a width of the waveguide core.

15. The recording head of claim 10, wherein the first and second reflective heatsink structures extend in the direction normal to the air-bearing surface a fifth distance that is greater than the second distance.

16. The apparatus of claim 10, wherein the fourth distance is greater than a width of the waveguide core.

17. The recording head of claim 10, wherein the first and second reflective heatsink structures are substantially mirror images of each other.

18. A recording head, comprising:
a waveguide core extending to an air-bearing surface;
a near-field transducer centrally aligned with the waveguide core and positioned proximate a first side of the waveguide core in a down-track direction;
first and second mirror portions forming a mirror and surrounding the near-field transducer in a cross-track direction with a gap therebetween, the mirror extending in the direction normal to the air-bearing surface a first distance that is less than a second distance that the near-field transducer extends in the direction normal to the air-bearing surface; and
first and second reflective heatsink structures respectively coupled to the first and second mirror portions, the heatsink structures spaced apart from the near-field transducer in the cross-track direction and extending in a direction normal to the air-bearing surface such that proximate the air-bearing surface the first and second reflective heatsink structures extend substantially parallel to each other and distal the air-bearing surface the first and second reflective heatsink structures curve away from each other toward respective distal edges.

19. The recording head of claim 18, wherein the first and second reflective heatsink structures extend in the direction normal to the air-bearing surface a third distance that is less than the second distance and greater than the first distance.

20. The recording head of claim 18, wherein the first and second reflective heatsink structures are separated by a gap having a width less than a width of the waveguide core.

* * * * *